US008349960B2

(12) United States Patent
Gaeberlein et al.

(10) Patent No.: US 8,349,960 B2
(45) Date of Patent: Jan. 8, 2013

(54) POLYMER-MODIFIED BUILDING MATERIAL DRY-MIXES

(75) Inventors: Peter Gaeberlein, Magdeburg (DE); Michael Schinabeck, Altenmarkt (DE); Gregor Herth, Trostberg (DE); Stefan Friedrich, Garching (DE); Werner Stohr, Augsburg (DE); Alexander Ehle, Kaufering (DE); Kornelia Kratzer, Prettelshofen (DE); Markus Streicher, Freidberg (DE); Volker Schwarz, Augsburg (DE); Astrid Kramer, Kissing (DE)

(73) Assignee: Construction Research & Technology GmbH, Trostberg (DE)

( * ) Notice: Subject to any disclaimer, the term of this patent is extended or adjusted under 35 U.S.C. 154(b) by 361 days.

(21) Appl. No.: 12/601,978

(22) PCT Filed: Apr. 28, 2008

(86) PCT No.: PCT/EP2008/055138
§ 371 (c)(1),
(2), (4) Date: Mar. 11, 2010

(87) PCT Pub. No.: WO2008/151878
PCT Pub. Date: Dec. 18, 2008

(65) Prior Publication Data
US 2010/0190888 A1 Jul. 29, 2010

(30) Foreign Application Priority Data
Jun. 14, 2007 (DE) .................... 10 2007 027 470

(51) Int. Cl.
*C08L 41/00* (2006.01)
*C08L 33/14* (2006.01)

(52) U.S. Cl. ........ 525/212; 524/502; 525/205; 525/207; 525/201

(58) Field of Classification Search .................. 524/2, 5, 524/502; 525/212, 205, 207, 201
See application file for complete search history.

(56) References Cited

U.S. PATENT DOCUMENTS

| | | | |
|---|---|---|---|
| 4,857,610 A | 8/1989 | Chmelir et al. | |
| 4,893,999 A | 1/1990 | Chmelir et al. | |
| 5,075,399 A | 12/1991 | Ahmed et al. | |
| 5,116,921 A | 5/1992 | Hsieh | |
| 6,187,887 B1 | 2/2001 | Albrecht et al. | |
| 6,395,853 B1 | 5/2002 | Oswald et al. | |
| 7,202,319 B2 | 4/2007 | Spindler et al. | |
| 7,238,760 B2 | 7/2007 | Schinabeck et al. | |
| 2001/0033941 A1* | 10/2001 | Kiesewetter et al. | 428/533 |
| 2003/0144386 A1 | 7/2003 | Pakusch et al. | |
| 2004/0024154 A1 | 2/2004 | Schinabeck et al. | |
| 2005/0143543 A1 | 6/2005 | Spindler et al. | |
| 2006/0130708 A1 | 6/2006 | Calva Garcia et al. | |
| 2007/0037925 A1* | 2/2007 | Weitzel et al. | 524/563 |
| 2007/0083020 A1 | 4/2007 | Schinabeck et al. | |
| 2007/0287817 A1* | 12/2007 | Maier et al. | 526/320 |
| 2008/0200590 A1 | 8/2008 | Schinabeck et al. | |
| 2009/0036571 A1* | 2/2009 | Friedrich et al. | 524/2 |
| 2009/0186964 A1 | 7/2009 | Schinabeck et al. | |

FOREIGN PATENT DOCUMENTS

| | | |
|---|---|---|
| DE | 10 2004 032 399 A1 | 2/2006 |
| DE | 10 2005 057 507 A1 | 6/2007 |
| DE | 10 2006 007 004 A1 | 8/2007 |
| EP | 0 936 228 A1 | 8/1999 |
| EP | 1 059 316 A1 | 12/2000 |
| EP | 1 726 432 A1 | 11/2006 |
| WO | WO 02/10229 A1 | 2/2002 |
| WO | WO 03/085013 A2 | 10/2003 |
| WO | WO 03/085013 A3 | 10/2003 |
| WO | WO 2005/035603 A1 | 4/2005 |
| WO | WO 2005/090424 A1 | 9/2005 |
| WO | WO 2006/002936 A1 | 1/2006 |
| WO | WO 2007/017286 A1 | 2/2007 |

OTHER PUBLICATIONS

PCT/EP2008/055138—Written Opinion of the International Searching Authority, Sep. 29, 2008.
PCT/EP2008/055138—International Search Report, Sep. 29, 2008.

* cited by examiner

*Primary Examiner* — James J Seidleck
*Assistant Examiner* — Deve E Valdez
(74) *Attorney, Agent, or Firm* — Curatolo Sidoti Co., LPA; Joseph G. Curatolo; Salvatore A. Sidoti

(57) ABSTRACT

The invention relates to polymer-modified cement-containing building material dry mixes which contain a redispersible polymer powder, water retention agents based on polysaccharide structures, a calcium-containing setting accelerator and a superabsorbent copolymer.

17 Claims, No Drawings

POLYMER-MODIFIED BUILDING MATERIAL DRY-MIXES

CROSS REFERENCE TO RELATED APPLICATIONS

This application is a national stage application of International Application No. PCT/EP2008/055138, filed 28 Apr. 2008, which claims the benefit of German Patent Application Ser. No. 10 2007 027 470.1, filed 14 Jun. 2007, from which applications priority is claimed, and which are incorporated herein by reference.

The present invention relates to cement-based dry mixes and their use.

"R. Bayer, H. Lutz, *Dry Mortars, Ullmann's Encyclopedia of Industrial Chemistry*, 6th ed., vol. 11. Wiley-VCH, Weinheim, (2003), 83-108" gives an overview of the uses and composition of dry mortars, e.g. binders, aggregates and various additives. In particular, polymer-modified cement-containing dry mixes obtained by means of additives such as redispersible polymer powders and/or cellulose ethers are customary, but these additives, especially the redispersible polymer powders, are very costly. The use of superabsorbents in building material mixes is likewise known. For example. US-A-2003144386 describes the use of superabsorbents in cement-containing building material mixes for improving the strength development. However, the water uptake capacity or water retention capacity of the superabsorbents disclosed in this document is relatively low in calcium-containing systems, for example in cement-containing systems. U.S. Pat. No. 6,187,887 describes water-soluble or water-swellable copolymers containing sulpho groups which are used for increasing the water retention in building material systems. These copolymers differ from the essentially insoluble superabsorbents in that they are soluble in water and have very little if any water uptake capacity. The technologies disclosed in the abovementioned documents are in need of improvement in respect of their economics, in particular in respect of their yield. The desired economically advantageous, high-yield dry mixes should display good product properties both in the fresh state and in the cured state.

It was therefore an object of the present invention to provide economical and high-quality dry mixes for producing aqueous building material systems.

This object is achieved by a hydraulically setting dry mix, preferably a tile adhesive in accordance with the standard EN 12004, characterized in that it comprises
a) from 10 to 95 percent by weight of a cement-containing, hydraulic binder,
b) from 5 to 75 percent by weight of inorganic fillers and/or organic fillers,
c) from 0.5 to 10 percent by weight of a redispersible polymer powder.
d) from 0.1 to 1.5 percent by weight of a water retention agent which is based on polysaccharide structures and is preferably soluble in water and is preferably selected from the group consisting of cellulose ethers, starch ethers and microbially produced or naturally occurring polysaccharides,
e) from 0.3 to 4.0 percent by weight of a preferably water-soluble setting accelerator selected from the group consisting of calcium formate, calcium chloride, calcium nitrate and either
$f_a$) from 0.02 to 2.0 percent by weight of anionic, pulverulent copolymer which is preferably swellable by means of water or salt solutions and is particularly preferably insoluble in water and can preferably be prepared by free-radical polymerization of ethylenically unsaturated vinyl compounds and whose particle size distribution determined in accordance with the standard edana 420.2-02 is preferably such that more than 98 percent by weight pass a sieve having a mesh size of 200 μm, with the copolymer comprising $f_a$-i) from 10 to 70 molpercent of structural units containing a sulphonic acid group and having the general formula (I)

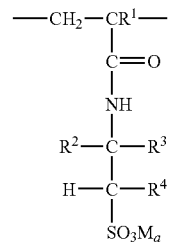

where
the radicals $R^1$
are identical or different and are each hydrogen or a methyl radical,
the radicals $R^2$, $R^3$, $R^4$
are in each case identical or different and are each, independently of one another, hydrogen, an aliphatic, branched or unbranched hydrocarbon radical having from 1 to 6 carbon atoms or an aromatic hydrocarbon radical having from 6 to 14 carbon atoms.
the ions M
are identical or different and are each hydrogen, a monovalent or divalent metal cation or an ammonium ion,
the indices a
are identical or different and are each either ½ or 1.
$f_a$-ii) from 30 to 90 molpercent of structural units containing a (meth)acrylamido group and having the general formula (II)

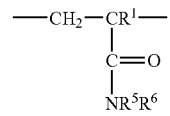

where
$R^1$ is as defined above,
the radicals $R^5$ and $R^6$
are in each case identical or different and are each, independently of one another, hydrogen, a branched or unbranched aliphatic hydrocarbon radical having from 1 to 20 carbon atoms, a cycloaliphatic hydrocarbon radical having from 5 to 8 carbon atoms or an aryl radical having from 6 to 14 carbon atoms,
$f_a$-iii) from 0.03 to 1 molpercent of structural units derived from preferably water-soluble monomer compounds which have more than one free-radically polymerizable, ethylenically unsaturated vinyl group, or, as an alternative to $f_a$),
$f_b$) from 0.02 to 2.0 percent by weight of a cationic pulverulent copolymer which is preferably swellable by means of water or salt solutions and is particularly preferably insoluble in water and can preferably be prepared by free-radical polymerization of ethylenically unsaturated vinyl compounds and whose particle size distribution determined in accordance with the standard edana 420.2-02 is preferably such that more than 98 percent by weight pass a sieve having a mesh size of 200 μm, with the copolymer comprising $f_b$-i) from 10 to 70 molpercent of cationic units containing a quaternized nitrogen atom and having the general formula (III)

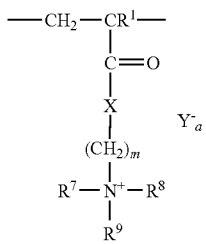

where
$R^1$ is as defined above,
the radicals $R^7$, $R^8$, $R^9$, $R^{10}$
are in each case identical or different and are each, independently of one another, hydrogen, a branched or unbranched aliphatic hydrocarbon radical having from 1 to 20 carbon atoms, a cycloaliphatic hydrocarbon radical having from 5 to 8 carbon atoms or an aryl radical having from 6 to 14 carbon atoms,
the indices m
are identical or different and are each an integer from 1 to 6,
the radicals X
are identical or different and are each oxygen or N—$R^{10}$.
the ions $Y^-_a$
are identical or different and are each a halide, $C_1$-$C_4$-alkyl-sulphate, $C_1$-$C_4$-alkylsulphonate or sulphate,
the indices a
are identical or different and are each either ½ or 1.
$f_b$-ii) from 30 to 90 molpercent of structural units containing a (meth)acrylamido group and having the general formula (II)

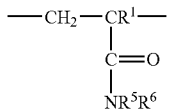

where
$R^1$ is as defined above,
$R^5$ and $R^6$
are each as defined above,
$f_b$-iii) from 0.03 to 1 molpercent of structural units derived from preferably water-soluble monomer compounds which have more than one free-radically polymerizable, ethylenically unsaturated vinyl groups.

The requirements which modern building material dry mixes have to meet, especially in the field of tile adhesives and some further application areas, are very high in respect of their properties both in the as yet uncured state (rheological processing properties such as slipping resistance and water retention) and in the cured state (abrasion resistance, scratch resistance, tensile strength in bending and adhesive pull strength on various substrates). These properties are, as described in "R. Bayer, H. Lutz, *Dry Mortars, Ullmann's Encyclopedia of Industrial Chemistry*, 6th ed., vol. 11, Wiley-VCH, Weinheim, (2003), 83-108", improved by additives known in the field of dry mixes, e.g. water retention agents based on polysaccharides (for example cellulose ethers) and redispersible polymer powders. However, the additives mentioned, particularly the dispersion powders, are very expensive compared to the other components of dry mixes. The yield of dry mixes, which is defined as the ratio of the volume of a ready-to-use building material mix after mixing the dry mix with water and the mass of the dry mortar, is in need of improvement both for economic reasons and in terms of further advantages for the user (e.g. less dry mortar has to be kept in stock). It is also necessary to accelerate the setting rate or the development of the (early) strength of the dry mortar. This is achieved in an advantageous way as a result of inter alia, its good effectiveness due to the use of calcium formate or other calcium salts. Other known setting accelerators such as alkanolamines would, particularly when used in interiors, have the disadvantage of an unpleasant odour or could also be problematical from a health point of view.

This leads to the technical object of improving the yield and economics of the dry mortars by means of suitable measures without a reduction in quality of the building material products having to be accepted.

This object is achieved by the use of the polymer-modified dry mixes of the invention which contain a superabsorbent, pulverulent copolymer (superabsorbent) which is suitable for increasing the tolerance to high W/C values. The polymer chemistry of the superabsorbent has, according to the invention, been adapted so that a high water uptake capacity is ensured even in aqueous systems containing calcium ions, for example in the cement-containing, hydraulically setting systems according to the invention which additionally contain calcium ions from the calcium-containing accelerator salt. The use of increased amounts of the extremely cheap component water to increase the yield is possible for the first time by means of the dry mortars of the invention, as a result of which their economics are also significantly improved. It has surprisingly been found that not only can the abovementioned demands on the product properties be met or exceeded but it is also possible to achieve a considerable reduction in the amounts of expensive formulation constituents such as the polysaccharide-based water retention agents and especially the redispersible dispersion powders. Particularly at high temperatures, low atmospheric humidity and when using tiles or substrates which strongly attract water, an improvement in the water retention properties of tile adhesive mortars and the adhesive pull strength values is observed. In addition, particularly preferably in tile adhesive mortars, further important properties such as the adhesive open time can be improved as a result of the presence of relatively high proportions of water in the total formulation.

To clarify the terminology, it should also be pointed out that dry mixes are frequently also referred to as dry mortars in the literature.

DETAILED DESCRIPTION OF THE INVENTION a) The cement-containing hydraulic binder is not subject to any particular restrictions in terms of the type of cement. It is possible to use portland cements, in particular those selected from the group consisting of CEM I, II, III, IV and V and alumina cements (aluminate cements). White cement is particularly suitable in cases where a corresponding coloration of the products plays a role. The cements mentioned can be used individually or as mixtures. The proportion by weight of the cement-containing hydraulic binder in the dry mix is, depending on the application, from 10 to 95% by weight, preferably from 20 to 80% by weight, particularly preferably from 30 to 50% by weight. In a further embodiment, pozzolanic and/or latently hydraulic binders can optionally be present in addition to the cements mentioned in the dry mix. Among pozzolanic and/or latently hydraulic additives, preference is given to using fly ash, microsilica, metakaolin, ground trass, aluminosilicate, tuff, phonolite, diatomaceous earth, amorphous precipitated silica, oil shale and blast furnace slag comprising mainly noncrystalline material. Their proportion in the dry mix is, if appropriate, from 1 to 30% by weight; they are preferably present in an amount of from 5 to 30% by weight, based on the cement.

b) The fillers in the dry mixes of the invention are soluble or swellable to only a small extent in the aqueous systems. In particular, they do not act as a binder.

Suitable inorganic fillers are, for example, silica sand, ground limestone, chalk, marble, clay, marl, aluminium oxide, talc and/or barite, with silica sand and ground limestone being preferred. The inorganic fillers can also preferably be present as lightweight fillers such as hollow glass microspheres such as foamed glass and as aluminosilicates such as pearlites and expanded clay. Natural lightweight fillers such as mineral foam, pumice, foamed larva and/or expanded vermiculite are likewise preferred. Organic fillers which can be used according to the invention are, for example, shredded plastic scrap, for example polyvinyl chloride, polystyrene, polyethylene, polypropylene or melamine resins. Rubber particles and/or Styropor spheres represent preferred organic fillers according to the invention.

The fillers are present in the dry mix in an amount of from 5 to 75% by weight, preferably from 10 to 60% by weight, particularly preferably from 30 to 50% by weight.

c) The term redispersible polymer powders refers to (co)polymers which can be obtained as a water-based dispersion by appropriate polymerization processes such as emulsion polymerization processes and are converted into a polymer powder in a further step by suitable drying measures such as spray drying. When mixed into water or aqueous systems, the redispersible polymer powder once again forms a water-based dispersion, hence the term redispersible polymer powder. The use of redispersible dispersion powders in aqueous building material mixes allows important product properties, in particular properties which are important in the cured state, for example abrasion resistance, scratch resistance, tensile strength in bending and surface adhesion to various substrates, to be improved. Redispersible polymer powders are known to act essentially as organic binders in the building material mix which has been made up with water, with this effect being based mainly on formation of a polymer film from the primary particles as a result of evaporation of water.

Suitable (co)polymers include those based on one or more ethylenically unsaturated monomers which can be selected from among one or more of the following monomer groups: vinylaromatics, vinyl esters or branched or unbranched alkylcarboxylic acids having from 1 to 15 carbon atoms, dienes, (meth)acrylic esters of branched or unbranched alcohols having from 1 to 10 carbon atoms, vinyl halides and olefins. The monomers should preferably have a hydrophobic character.

Examples of preferred monomers which come within the group of vinylaromatics are styrene, vinyltoluene and α-methylstyrene. As preferred vinyl esters of branched or unbranched alkylcarboxylic acids having from 1 to 15 carbon atoms, mention may be made of vinyl acetate, vinyl propionate, vinyl butyrate, vinyl 2-ethyl-hexanoate, 1-methylvinyl acetate, vinyl laurate and vinyl esters of monocarboxylic acids which have a tertiary carbon atom in the alpha position relative to the acid group and have from 5 to 11 carbon atoms (vinyl versatates), for example VeoVa5® (vinyl pivalate). VeoVa9®, VeoVa10® and VeoVa11® (trade names of Shell), with vinyl acetate and the abovementioned vinyl versatates being particularly preferred. Preferred dienes are 1,3-butadiene and isoprene, and preferred (meth)acrylic esters of branched or unbranched alcohols having from 1 to 10 carbon atoms are methyl (meth)acrylate, ethyl(meth)acrylate, propyl(meth)acrylate, n-butyl (meth)acrylate, and 2-ethylhexylacrylate.

Preferred olefins are ethylene, propylene, 1-butene and 2-methylpropene, particularly preferably ethylene. Preferred vinyl halide monomers are vinyl chloride and vinylidene chloride.

As (co)polymers suitable as redispersible polymer powders, preference is given to the following types, with the figures for the respective monomers being % by weight based on the (co)polymer and, if appropriate together with further monomer units, adding up to 100% by weight:

From the group of polymers of vinyl alkylcarboxylates, preference is given to vinyl acetate polymers which may be partially hydrolyzed; vinyl acetate-ethylene copolymers having an ethylene content of from 1 to 60% by weight; vinyl acetate copolymers with from 1 to 50% by weight of one or more, further vinyl ester monomers such as vinyl laurate, vinyl pivalate and in particular VeoVa9®, VeoVa10® and VeoVa11® (trade names of Shell), with these copolymers being able to contain from 1 to 40% by weight of ethylene as further monomer; vinyl ester-ethylene-vinyl chloride copolymers having an ethylene content of from 1 to 40% by weight and a vinyl chloride content of from 20 to 90% by weight (possible vinyl esters are, for example, vinyl acetate, vinyl propionate, vinyl butyrate, vinyl 2-ethyl-hexanoate, 1-methylvinyl acetate, vinyl laurate and vinyl esters of monocarboxylic acids which have a tertiary carbon atom in the alpha position relative to the acid group and have from 5 to 11 carbon atoms (vinyl versatates), for example VeoVa5® (vinyl pivalate), VeoVa9®, VeoVa10® and VeoVa11® (trade names of Shell)); vinyl acetate-acrylic ester copolymers which contain from 1 to 60% by weight of acrylic ester, preferably n-butyl acrylate, and may additionally contain from 1 to 40% by weight of ethylene.

Among the group of (meth)acrylic ester polymers, preference is given to copolymers composed of the monomer units n-butyl acrylate and/or 2-ethylhexyl acrylate; copolymers of methyl methacrylate with n-butyl acrylate and/or 2-ethyl-hexylacrylate and copolymers of methyl methacrylate with 1,3-butadiene.

Among the group of vinyl halide copolymers, preference is given to the abovementioned vinyl ester-ethylene-vinyl chloride copolymers and also vinyl chloride-ethylene copolymers and vinyl chloride-acrylate copolymers.

Among the group of vinylaromatic copolymers, preference is given to styrene-butadiene copolymers and styrene-acrylic ester copolymers such as styrene-n-butyl acrylate or styrene-2-ethylhexylacrylate having a styrene content of in each case from 10 to 70% by weight.

In a further embodiment, particular preference is given to vinyl acetate polymers, vinyl acetate-ethylene copolymers having an ethylene content of from 1 to 60% by weight, vinyl acetate copolymers with from 1 to 50% by weight of one or more, further vinyl ester monomers such as vinyl laurate, vinyl pivalate and in particular vinyl versatates such as VeoVa9®, VeoVa10® and VeoVa11® (trade names of Shell), with these copolymers additionally being able to contain from 1 to 40% by weight of ethylene as further monomer. Particular preference is also given to vinyl acetate-acrylic ester copolymers which contain from 1 to 60% by weight of acrylic ester, preferably n-butyl acrylate, and may additionally contain from 1 to 40% by weight of ethylene. Particular preference is also given to styrene-butadiene copolymers and styrene-acrylic ester copolymers such as styrene-n-butyl acrylate or styrene-2-ethylhexylacrylate having a styrene content of in each case from 10 to 70% by weight.

The redispersible polymer powder c) is very particularly preferably present as vinyl acetate polymer, vinyl acetate-ethylene copolymer, vinyl acetate-vinyl ester copolymer and/or vinyl acetate-vinyl ester-ethylene copolymer, with the vinyl ester monomers being selected in each case from the group consisting of vinyl laurate, vinyl pivalate and vinyl versatates, also as vinyl acetate-acrylic ester copolymer, vinyl acetate-acrylic ester-ethylene copolymer, styrene-butadiene copolymer and styrene-acrylic ester copolymer, with the acrylic esters in each case being esters of branched or unbranched alcohols having from 1 to 10 carbon atoms.

If appropriate, the (co)polymers can additionally contain functional comonomer units in an amount of from 0.1 to 10% by weight, based on the total weight of the polymer. These functional comonomer units can be selected from the group consisting of monocarboxylic or dicarboxylic acids, for example (meth)acrylic acid and/or maleic acid; the group consisting of ethylenically unsaturated carboxamides such as (meth)acrylamide; from the group consisting of ethylenically unsaturated sulphonic acids and salts thereof, preferably vinylsulphonic acid and/or styrene-sulphonic acid; from the group consisting of multiply ethylenically unsaturated comonomers, for example divinyl adipate, triallyl isocyanurate, diallyl maleate and/or allyl methacrylate. The proportion of structural units containing a (meth)-acrylamido group in the redispersible polymer powders of the general formula II is preferably less than 25 mol %. The (co)polymerization is carried out by processes well known in the industry, e.g. the emulsion polymerization process. The dispersions obtained can be stabilized either by means of an emulsifier or by means of a protective colloid such as polyvinyl alcohol. To obtain the redispersible polymer powders, drying is carried out, usually by conventional processes such as spray drying, freeze drying, coagulation of the dispersion and subsequent fluidized-bed drying. The preferred process is spray drying. The redispersible polymer powders are present in the hydraulically setting dry mix in an amount of from 0.5 to 10% by weight, preferably from 0.8 to 7% by weight, particularly preferably from 1.0 to 4% by weight.

d) The preferably water-soluble water retention agents based on polysaccharide structures serve not only to retain water but also to set rheological properties of the corresponding building material mixes, for example the viscosity and/or the thixotropy. Thixotropic properties are necessary, for example in tile adhesive mortars, in order to improve the slip resistance while at the same time allowing the position of the tile to be corrected readily.

Preference is given to cellulose ethers, for example alkylcelluloses such as methylcellulose, ethylcellulose, propylcellulose and methylethylcellulose, hydroxy-alkylcelluloses such as hydroxyethylcellulose (HEC), hydroxypropylcellulose (HPC) and hydroxyethylhydroxypropylcellulose, alkylhydroxyalkylcelluloses such as methylhydroxyethylcelluose (MHEC), methylhydroxypropylcelluose (MHPC) and propylhydroxypropylcellulose. Preference is given to the cellulose ether derivatives methylcellulose (MC), hydroxypropylcellulose (HPC), hydroxy-ethylcellulose (HEC) and ethylhydroxyethylcellulose (EHEC), and particular preference is given to methylhydroxyethylcelluose (MHEC) and methylhydroxy-propylcelluose (MHPC). The abovementioned cellulose ether derivatives, which can in each case be obtained by appropriate alkylation or alkoxylation of cellulose, are preferably present as nonionic structures. On the other hand, carboxy-methylcellulose (CMC), for example, is less suitable since the carboxylic acid groups interact with the calcium ions present in the aqueous cement-containing systems and thus reduce the solubility of the carboxymethylcellulose and consequently its effectiveness. This effect is reinforced by calcium-containing setting accelerators. In addition, preference is also given to using nonionic starch ether derivatives such as hydroxypropylstarch, hydroxyethylstarch and methyl-hydroxypropylstarch. Preference is given to hydroxypropylstarch. The starch ether derivatives are present in the dry mix either alone or, preferably, in combination with one or more of the abovementioned cellulose ether derivatives; they are particularly preferably present together with methylhydroxyethylcellulose (MHEC) and/or methylhydroxypropylcelluose (MHPC). Preference is likewise given to microbially produced polysaccharides such as welan gum and/or xanthans and naturally occurring polysaccharides such as alginates, carregeenans and galactomannans. These can be obtained from appropriate natural products by extractive processes, for example in the case of alginates and carregeenans from algae, in the case of galactomannans from carob seeds. The choice of the water retention agents and the amount(s) used is made according to requirements and is established by appropriate routine tests. It is possible for one or more of the abovementioned water retention agents to be present in the dry mix of the invention.

The water retention agents based on polysaccharide structures are present in the hydraulically setting dry mix in an amount, based on the dry mix, of from 0.1 to 1.5% by weight, preferably from 0.2 to 1.2% by weight, particularly preferably from 0.3 to 1.0% by weight.

e) Suitable setting accelerators are the water-soluble calcium salts calcium formate, calcium chloride and/or calcium nitrate. Preference is given to calcium formate. The setting accelerators are used in a proportion of from 0.3 to 4.0% by weight, preferably from 0.5 to 3.0% by weight, particularly preferably from 0.8 to 2.5% by weight, based on the dry mix. They serve both to shorten the setting times and to increase the early strength of the building material products.

$f_a$) and $f_b$)

The pulverulent copolymers which are swellable by means of water or aqueous salt solutions are crosslinked, high molecular weight, either anionic or cationic poly-electrolytes which can be obtained by free-radical polymerization of suitable, ethylenically unsaturated vinyl compounds and subsequent drying of the copolymers obtained. In industry, they are usually referred to as superabsorbent polymers (SAP) or simple superabsorbents. On contact with water or aqueous systems, they take up water and swell to form a hydrogel. It is possible for them to take up a weight of water which is a multiple of the weight of the pulverulent copolymer. For the present purposes, hydrogels are water-containing gels based on hydrophilic but crosslinked water-insoluble polymers which are present as three-dimensional networks. The hydrogel formed from the pulverulent, superabsorbent copolymer by uptake of water should contain very little material which is soluble in water so as not to have an adverse effect on the rheological properties of the building material mixes. In the present invention, it is advantageous to use superabsorbents which have a high water absorption capacity even at high salt concentrations, in particular at high calcium ion concentrations as are usually present in cement-containing aqueous systems.

The pulverulent copolymers (superabsorbents) used according to the invention are preferably present as either anionic or cationic polyelectrolytes and essentially not as polyampholytes. For the purposes of the present invention, polyampholytes are polyelectrolytes which bear both cationic and anionic charges on the polymer chain. The greatest preference is thus given to copolymers which are purely anionic or cationic in nature. However, it is possible for up to 10%, preferably less than 5%, of the total charge of a polyelectrolyte to be replaced by opposite charges. This applies both to the case of predominantly anionic copolymers having a relatively low cationic content and conversely to the case of predominantly cationic copolymers having a relatively low anionic content.

The anionic superabsorbent copolymers $f_a$) will be described first. Structural units containing a sulphonic acid group and having the general formula I are present as anionic structural units. Monomers containing sulphonic acid groups are preferred over monomers containing carboxylic acid groups since they form more stable hydrogels which can take up more water in aqueous salt solutions, particularly in the presence of calcium ions. In particular, the superabsorbents containing sulphonic acid groups are superior in terms of this property to the superabsorbents containing mainly carboxylic acid groups, e.g. those based on crosslinked high molecular weight polyacrylic acid. The structural unit containing a sulphonic acid group and corresponding to the general formula I is preferably derived from the copolymerization of one or more of the monomer species 2-acrylamido-2-methylpropanesulphonic acid, 2-methacrylamido-2-methylpropanesulphonic acid, 2-acrylamidobutanesulphonic acid, and/or 2-acrylamido-2,4,4-trimethylpentane-sulphonic acid or the salts of the acids mentioned. Particular preference is given to 2-acrylamido-2-methylpropanesulphonic acid and its salt compounds. The cations in the salt compounds of the acids can in each case be monovalent or divalent metal cations, e.g. preferably sodium, potassium, calcium or magnesium ions, or ammonium ions derived from ammonia, primary, secondary or tertiary, $C_1$-$C_{20}$-alkylamines. $C_1$-$C_{20}$-alkanolamines. $C_5$-$C_8$-cycloalkylamines and $C_6$-$C_{14}$-arylamines. The alkyl radicals can in each case be branched or unbranched. Examples of appropriate amines are methylamine, dimethylamine, trimethylamine, ethanolamine, diethanolamine, triethanolamine, cyclohexyl amine, dicyclohexylamine, phenyl-amine and diphenylamine. Preferred cations are alkali metal ions and/or ammonium ions, particularly preferably the sodium ion.

In the anionic superabsorbent copolymers $f_a$), the structural units containing a sulphonic acid group are present in an amount of from 10 to 70 molpercent, preferably from 15 to 60 molpercent and very particularly preferably from 20 to 50 molpercent.

Furthermore, structural units containing a (meth)acrylamido group and corresponding to the general formula II are also present in the anionic super-absorbent copolymers $f_a$). The structural units containing a (meth)acrylamido group are also present in a manner analogous to the cationic superabsorbent copolymers. The following description applies to both the anionic superabsorbent copolymers and the cationic superabsorbent copolymers. For example, the structural units are derived from the copolymerization of one or more of the monomer species acrylamide, methacrylamide, N-methylacrylamide, N-methylmethacrylamide. N,N-dimethylacrylamide, N-ethylacrylamide, N,N-diethylacrylamide. N-cyclohexylacrylamide, N-benzylacrylamide, N,N-dimethylaminopropylacrylamide, N,N-dimethylaminoethylacrylamide and/or N-tert-butylacrylamide. Preference is given to methylacrylamide, N,N-dimethylacrylamide and methacrylamide, and particular preference is given to acrylamide. In both the anionic and cationic superabsorbent copolymers, the structural units containing a (meth)acrylamido group are present in an amount of from 30 to 90 molpercent, preferably from 40 to 85 molpercent and very particularly preferably from 50 to 80 molpercent.

The structural units of the anionic superabsorbent copolymer which are derived from preferably water-soluble monomer compounds having more than one free-radically polymerizable, ethylenically unsaturated vinyl group will be referred to as crosslinker monomers in the further description. They are also present in an analogous way in the cationic superabsorbent copolymers. The following description of the crosslinker monomers applies both to the anionic superabsorbent copolymers and the cationic superabsorbent copolymers.

The structural unit corresponding to the crosslinker monomers is preferably derived from the polymerization of one or more of the following monomer species:
multiply (meth)acrylic-functional monomers such as 1,4-butanediol diacrylate, 1,4-butanediol dimethacrylate, 1,3-butylene glycol diacrylate, 1,3-butylene glycol dimethacrylate, diethylene glycol diacrylate, diethylene glycol dimethacrylate, ethylene glycol dimethacrylate, ethoxylated bisphenol A diacrylate, ethoxylated bisphenol A dimethacrylate, ethylene glycol dimethacrylate, 1,6-hexanediol diacrylate, 1,6-hexanediol dimethacrylate, neopentyl glycol dimethacrylate, poly-ethylene glycol diacrylate, polyethylene glycol dimethacrylate, triethylene glycol diacrylate, triethylene glycol dimethacrylate, tripropylene glycol diacrylate, tetra-ethylene glycol diacrylate, tetraethylene glycol diacrylate, tetraethylene glycol dimethacrylate, dipentaerythritol pentaacrylate, pentaerythritol tetraacrylate, penta-erythritol triacrylate, trimethylolpropane triacrylate, trimethylol trimethacrylate, cyclopentadiene diacrylate, tris(2-hydroxyethyl)isocyanurate triacrylate and/or tris(2-hydroxy)isocyanurate trimethacrylate; monomers having more than one vinyl ester or allyl ester group with a corresponding carboxylic acid, for example divinyl esters of polycarboxylic acids, diallyl esters of polycarboxylic acids, triallyl terephthalate, diallyl maleate, diallyl fumarate, trivinyl trimellitate, divinyl adipate and/or diallyl succinate; monomers having more than one (meth)acrylamido group e.g. N,N'-methylenebisacrylamide and/or N,N'-methylenebismethacrylamide, and monomers having more than one maleimidc group, e.g. hexamethylene-bismaleimide; monomers having more than one vinyl ether group, e.g. ethylene glycol divinyl ether, triethylene glycol divinyl ether and/or cyclohexanediol divinyl ether. It is also possible to use allylamino or allylammonium compounds having more than one allyl group, e.g. triallylamine and/or tetraallylammonium salts. Among the group of monomers having more than one vinylaromatic group, mention may be made of divinylbenzene.

In selecting the appropriate monomers having more than one ethylenically unsaturated vinyl group, care should preferably be taken to ensure that these have a good hydrolysis resistance in aqueous systems, especially at the high pH values to be expected in cement-containing systems. Mechanical stresses in the form of shear forces occur on mixing the building material mixes with water and can lead to fracture of bonds, especially in the case of high molecular weight crosslinked polymer systems. For this reason, methacrylic-functional crosslinker monomers are preferred over the corresponding acrylic-functional crosslinker monomers; the (meth)acrylamido-functional monomers and the allylamino-functional monomers are particularly preferred. Examples of particularly preferred crosslinker monomers are N,N'-methylenebisacrylamide, N,N'-methylenebismethacrylamide, triallyl isocyanurate, triallylamine and/or tetraallylammonium salts, and very particularly preferred crosslinker monomers are N,N'-methylenebisacrylamide. N,N'-methylenebismethacrylamide, triallyl isocyanurate and/or triallylamine. It is in each case possible for one or more of the crosslinker monomers to be represented in the copolymers. The crosslinker monomers are present in an amount of from 0.03 to 1 molpercent, preferably from 0.05 to 0.7 molpercent, in the anionic and cationic superabsorbent copolymers. The amount of crosslinker monomers should be at least so high that very water-insoluble copolymers or copolymers having a low content of soluble material or a low content of extractable material are obtained. A person skilled in the art will be able to determine the amount of crosslinker monomers in a simple manner by carrying out routine tests. Crosslinking occurs during the course of the copolymerization reaction; in addition, after-crosslinking can also be carried out subsequent to the copolymerization reaction, as described for superabsorbents in "F. Buchholz. A. Graham, *Modern Superabsorber Technology*, John Wiley & Sons Inc., 1989, 55-67".

Apart from the abovementioned three types of structural units which are necessary in the anionic copolymers according to the main claim, from 1 to 20 molpercent of further, preferably hydrophilic structural units can optionally be present. These are preferably derived from uncharged or anionic, ethylenically unsaturated monomers. In the case of cationic monomers, the abovementioned restrictions in respect of the proportions in the anionic copolymer apply, i.e. up to 10 percent, preferably less than 5 percent, of the anionic charges can be replaced by cationic charges. Examples of possible uncharged monomers are acrylonitrile, methacrylonitrile, vinylpyridine, vinyl acetate and/or hydroxyl-containing (meth)acrylic esters such as hydroxyethyl acrylate, hydroxypropyl acrylate and/or hydroxypropyl methacrylate.

The optional structural units are preferably derived from monomers selected from the group consisting of ethylenically unsaturated carboxylic acids and dicarboxylic acids and their anhydrides, e.g. methacrylic acid, ethacrylic acid, α-chloroacrylic acid, α-cyanoacrylic acid, β-methylacrylic acid (crotonic acid), α-phenylacrylic acid, β-acryloxypropionic acid, sorbic acid, α-chlorosorbic acid, 2'-methyl-isocrotonic acid, cinnamic acid, maleic acid and maleic anhydride, p-chlorocinnamic acid, β-stearic acid, itaconic acid, citraconic acid, mesaconic acid, glutaconic acid, aconitic acid, fumaric acid and/or tricarboxylethylene. The further structural units are preferably derived from acrylic acid and its salts and/or ethylenically unsaturated sulphonic acid monomers and in each case their corresponding salts, e.g. vinylsulphonic acid, allylsulphonic acid, styrenesulphonic acid, sulphoethyl acrylate, sulphoethyl methacrylate, sulphopropyl acrylate, sulphopropyl methacrylate and/or 2-hydroxy-3-methacryloxypropyl-sulphonic acid.

The cationic superabsorbent copolymers $f_b$) will be described below. In the cationic copolymers, the structural unit containing a quaternized nitrogen atom and corresponding to the general formula III is preferably derived from the polymerization of one or more monomer species selected from the group consisting of [2-(acryloyl oxy)ethyl]trimethyl ammonium salts, [2-(methacryloyloxy)ethyl]-trimethylammonium salts, [3-(acryloylamino)propyl]trimethylammonium salts and [3-(methacryloylamino)propyl]trimethylammoniutn salts. The salts mentioned are preferably present as halides or methosulphates. Particular preference is given to [3-(acryloylamino)propyl]trimethylammonium salts and/or [3-(methacryloylamino)-propyl]trimethylammonium salts. Very particular preference is given to [3-(acryloylamino)propyl]trimethylammonium chloride (DIMAPA-Quat) and/or [3-(methacryloylamino)propyl]trimethylammonium chloride (MAPTAC). The structural unit containing a quaternary nitrogen atom and having the general formula III is present in an amount of from 10 to 70 molpercent, preferably from 15 to 60 molpercent and particularly preferably from 20 to 50 molpercent, in the cationic superabsorbent copolymers.

Like the anionic superabsorbent copolymers $f_a$), the cationic superabsorbent copolymers $f_b$) contain the same structural units containing (meth)acrylamido groups and having the general formula II. The structural units of the general formula II have been described in detail above for the anionic copolymers and this description is hereby incorporated by reference at the present point.

The structural units derived from preferably water-soluble monomer compounds which have more than one free-radically polymerizable, ethylenically unsaturated vinyl group (crosslinker monomers) are likewise present both in the cationic superabsorbent copolymer and in the anionic superabsorbent copolymer. This structural unit has likewise been described in detail above for the anionic superabsorbent copolymers. This description is hereby likewise incorporated by reference at this point.

Apart from the abovementioned three types of structural units which are necessary in the cationic copolymers according to the main claim, from 1 to 20 molpercent of further, preferably hydrophilic structural units can optionally be present. These are preferably derived from uncharged or cationic, ethylenically unsaturated monomers. In the case of anionic monomers, the abovementioned restrictions in respect of the proportions in the cationic copolymer apply, i.e. up to 10 percent, preferably less than 5 percent, of the cationic charges can be replaced by anionic charges. Examples of possible uncharged monomers are acrylonitrile, methacrylonitrile, vinylpyridine, vinyl acetate and/or hydroxyl-containing (meth)acrylic esters such as hydroxyethyl acrylate, hydroxypropyl acrylate and/or hydroxypropyl methacrylate. Examples of suitable cationic monomers are N,N'-dimethyldiallylammonium chloride and N,N'-diethyldiallylammonium chloride.

A particularly preferred embodiment of the anionic superabsorbent copolymer $f_a$), contains structural units of which from 20 to 50 molpercent are derived from 2-acrylamido-2-methylpropanesulphonic acid (corresponding to structural unit I), and from 50 to 80 molpercent are derived from acrylamide (corresponding to structural unit II) and the crosslinker monomer is triallylamine and/or N,N'-methylenebisacrylamide. In a likewise particularly preferred embodiment of the cationic superabsorbent copolymer $f_b$), the copolymer $f_b$) contains structural units of which from 20 to 50 molpercent are derived from [3-(acryloylamino)propyl]trimethylammonium chloride (corresponding to structural unit III) and from 50 to 80 molpercent are derived from acrylamide (corresponding to structural unit II) and the crosslinker monomer is triallylamine and/or N,N'-methylenebisacrylamide.

The anionic or cationic superabsorbent copolymers used according to the invention can be prepared in a manner known per se by linking of the monomers forming the respective structural units by means of free-radical polymerization (anionic copolymers; structural units of the general formulae I, II and the above-described crosslinker monomers; optionally further anionic or uncharged monomers; cationic copolymers; structural units of the general formulae III, II and the above-described crosslinker monomers, optionally further cationic or uncharged monomers).

All monomers present as acid can be polymerized as free acids or in their salt form. Furthermore, neutralization of the acids can also be effected after the copolymerization by addition of appropriate bases, and partial neutralization before or after the polymerization is likewise possible. The neutralization of the monomers or the copolymers can, for example, be effected by means of the bases sodium hydroxide, potassium hydroxide, calcium hydroxide, magnesium hydroxide and/or ammonia. Further suitable bases are primary, secondary or tertiary $C_1$-$C_{20}$-alkyl-amines having branched or unbranched alkyl groups in each case, $C_1$-$C_{20}$-alkanolamines, $C_5$-$C_8$-cycloalkylamines, and/or $C_6$-$C_{14}$-arylamines. It is possible to use one or more bases. Preference is given to neutralization by means of alkali metal hydroxides and/or ammonia, particularly preferably sodium hydroxide. The inorganic or organic bases should be selected so that they form salts which are relatively readily soluble in water with the respective acid.

The monomers are preferably copolymerized by free-radical bulk, solution, gel, emulsion, dispersion or suspension polymerization. Since the products according to the invention are hydrophilic copolymers which are swellable in water, polymerization in an aqueous phase, polymerization in an inverted emulsion or polymerization in inverse suspension is preferred. In particularly preferred embodiments, the reaction is carried out as a gel polymerization or as an inverse suspension polymerization in organic solvents.

The copolymerization of the superabsorbent polymer can, in a particularly preferred embodiment, be carried out as an adiabatic polymerization and be initiated either by means of a redox initiator system or by means of a photoinitiator. In addition, a combination of the two initiation variants is possible. The redox initiator system consists of at least two components, viz. an organic or inorganic oxidizing agent and an organic or inorganic reducing agent. Use is frequently made of compounds having peroxide units, e.g. inorganic peroxides such as alkali metal and ammonium persulphate, alkali metal and ammonium perphosphates, hydrogen peroxide and its salts (sodium peroxide, barium peroxide) or organic peroxides such as benzoyl peroxide, butyl hydroperoxide or peracids such as peracetic acid. However, it is also possible to use other oxidizing agents, for example potassium permanganate, sodium and potassium chlorate, potassium dichromate, etc. As reducing agent, it is possible to use sulphur-containing compounds such as sulphites, thiosulphates, sulphinic acid, organic thiols (for example ethyl mercaptan, 2-hydroxyethanethiol. 2-mercaptoethylammonium chloride, thioglycolic acid) and others. Furthermore, ascorbic acid and low-valency metal salts are possible [copper(I); manganese(II); iron (II)]. It is also possible to use phosphorus compounds, for example sodium hypophosphite.

In the case of photopolymerization, this is initiated by means of UV light which brings about the disintegration of a photoinitiator. As photoinitiator, it is possible to use, for example, benzoin and benzoin derivatives such as benzoin ethers, benzil and its derivatives, e.g. benzil ketals, acryldiazonium salts, azo initiators such as 2,2'-azobis(isobutyronitrile), 2,2'-azobis(2-amidinopropane) hydrochloride, and/or aceto-phenone derivatives.

The proportion by weight of the oxidizing component and the reducing component in the case of the redox initiator systems is in each case preferably in the range from 0.00005 to 0.5% by weight, particularly preferably in each case from 0.001 to 0.1% by weight. In the case of photoinitiators, this range is preferably from 0.001 to 0.1% by weight, particularly preferably from 0.002 to 0.05% by weight. The percentages by weight given for oxidizing and reducing component and photoinitiators are in each case based on the mass of the monomers used for the copolymerization. The choice of polymerization conditions, in particular the amounts of initiator, is made with the objective of producing very long-chain polymers. However, owing to the insolubility of the crosslinked copolymers, the molecular weights can be measured only with great difficulty.

The copolymerization is preferably carried out in aqueous solution, preferably in concentrated aqueous solution, either batchwise in a polymerization vessel (batch process) or continuously by the "continuous conveyor belt" method described in U.S. Pat. No. 4,857,610. A further possibility is polymerization in a continuously or discontinuously operated kneading reactor. The process is usually initiated at a temperature in the range from −20 to 20° C., preferably from −10 to 10° C., and carried out at atmospheric pressure without external heating, with a maximum final temperature, which is dependent on the monomer content, of from 50 to 150° C., being obtained as a result of the heat of polymerization. After the copolymerization is complete, comminution of the polymer, which is present as a gel, is generally carried out. If the copolymerization is carried out on a laboratory scale, the comminuted gel is dried in a convection drying oven at from 70 to 180° C., preferably from 80 to 150° C. On an industrial scale, drying can also be carried out continuously in the same temperature ranges, for example on a belt dryer or in a fluidized-bed dryer.

In a further preferred embodiment, the copolymerization is carried out as an inverse suspension polymerization of the aqueous monomer phase in an organic solvent. Here, the monomer mixture which has been dissolved in water and neutralized if appropriate is preferably polymerized in the presence of an organic solvent in which the aqueous monomer phase is insoluble or sparingly soluble. The copolymerization is preferably carried out in the presence of "water-in-oil" emulsifiers (W/O emulsifiers) and/or protective colloids based on low molecular weight or high molecular weight compounds which are used in proportions of from 0.05 to 5% by weight, preferably from 0.1 to 3% by weight, based on the monomers. The W/O emulsifiers and protective colloids are also referred to as stabilizers. It is possible to use customary compounds known as stabilizers in inverse suspension poly-merization technology, e.g. hydroxypropylcellulose, ethylcellulose, methylcellulose, mixed cellulose acetate butyrate ethers, copolymers of ethylene and vinyl acetate, of styrene and butyl acrylate, polyoxyethylenesorbitan monooleate, monolaurate or monostearate and block copolymers of propylene oxide and/or ethylene oxide.

Organic solvents used are, for example, linear aliphatic hydrocarbons such as n-pentane, n-hexane, n-heptane, branched aliphatic hydrocarbons (isoparaffins), cycloaliphatic hydrocarbons such as cyclohexane and decalin, and aromatic hydrocarbons such as benzine, toluene and xylene. Further suitable solvents are alcohols, ketones, carboxylic esters, nitro compounds, halogen-containing hydrocarbons, ethers and many other organic solvents. Preference is given to organic solvents which form azeotropic mixtures with water, particularly preferably those which have a very high proportion of water in the azeotrope.

The water-swellable copolymers are initially obtained in swollen form as finely divided aqueous droplets in the organic suspension medium and are preferably isolated as solid spherical particles in the organic suspension medium by removal of the water. Removal of the suspension medium and drying leaves a pulverulent solid. It is known that inverse suspension polymerization has the advantage that the particle size distribution of the powders can be controlled by variation of the polymerization conditions and it is therefore usually possible to avoid an additional process step (milling step) for adjusting the particle size distribution.

Preference is given to anionic and cationic superabsorbent copolymers whose particle size distribution determined in accordance with the standard edana 420.2-02 is such that more than 98 percent by weight pass a sieve having a mesh size of 200 μm and particularly preferably more than 98 percent by weight pass a sieve having a mesh size of 100 μm. Very particular preference is given to more than 98 percent by weight passing a sieve having a mesh size of 63 μm.

The particle size distribution can be set by milling of the products obtained after drying of the copolymers. Large particles would result in visually recognizable inhomogeneous regions in which only the hydrogel formed by swelling of the super-absorbent is present in the aqueous building material mixes. The risk of demixing of the hydrogels would also be increased and further important properties such as the strength development could be adversely affected. The probability of after-thickening, which is undesirable for the user, is also greater in the case of large particles. High shear forces such as those which occur, for example, on mixing the building material mixes with water by means of a drilling machine customary for mixing of tile adhesives, etc, or similar mixers can in the case of large particles also be greater and lead to comminution of the hydrogels and thus to an increase in the proportion of soluble or extractable material which is responsible for the thickening effect (after-thickening effect). Setting of the correct consistency of the building material mix is then very difficult for the user. One test method for shear stability is, for example, to mix a tile adhesive according to the invention with water and then stir by means of a drilling machine for a further 30 seconds. The slump should then preferably change by not more than 0.5 cm.

Advantageous superabsorbent copolymers quickly develop their full water uptake capacity in the aqueous systems. A slow water uptake would likewise lead to undesirable after-thickening due to slow withdrawal of water from the building material mix. To test whether after-thickening is present, water is added to the building material mix, e.g. a tile adhesive, and the mixture is stirred. The slump should preferably change by less than 0.5 cm between the third and tenth minute after the addition of water.

A preferred property of both the anionic and cationic superabsorbent copolymers is their insolubility in aqueous systems or the property of having only a low proportion of extractable material. The proportion of extractable material is the proportion which can diffuse from the superabsorbent polymer into a surrounding aqueous medium. The method of determining the proportion of extractable material is described in more detail in the section on test methods. The proportion of extractable material is, in each case based on the mass of the superabsorbent, preferably less than 10% by weight, particularly preferably less than 9% by weight and very particularly preferably less than 8% by weight.

Last but not least, the uptake capacity of the anionic and cationic superabsorbents in aqueous salt solutions and in particular in solutions containing calcium ions is preferably very high for economic reasons. The uptake capacity is defined as the ratio of the mass of liquid taken up and the mass of the dry superabsorbent (reported in g/g) and is determined in accordance with the standard edana 440.2-02 with modification of the method, i.e. replacement of the 0.9 percent strength sodium chloride solution specified there as test liquid by a one percent strength calcium formate solution. The method is described in more detail in the section on test methods. In the case of products which are produced by the gel polymerization process, the uptake capacity is preferably more than 10 g/g, particularly preferably more than 15 g/g and very particularly preferably greater than 20 g/g. In the case of products which have been produced by the inverse suspension polymerization process, the uptake capacity determined by the same method is preferably greater than 5 g/g, particularly preferably greater than 10 g/g and in particular greater than 15 g/g. The superabsorbent polymers preferably have such an uptake capacity and are present in the dry mix in such an amount that they can take up from 10 to 40% by weight, preferably from 15 to 35% by weight, particularly preferably from 20 to 30% by weight, of the amount of water added to the dry mix. Both the anionic superabsorbent copolymers and the cationic superabsorbent copolymers are present in the dry mix in an amount of from 0.02 to 2.0% by weight, preferably from 0.1 to 1.5% by weight, particularly preferably from 0.2 to 1.0% by weight. The anionic superabsorbent copolymers are preferred over the cationic superabsorbent copolymers.

The superabsorbent copolymers hold water or salt solutions containing calcium ions as are present in the building material mixes as hydrogel in microregions. As a result of the use of amounts which are quite small compared to the other components of the building material mix of the relatively inexpensive superabsorbent copolymers used according to the invention, the amount of (make-up) water and thus also the volume of the ready-to-use building material mix can be increased significantly.

The dry mixes containing superabsorbent copolymers according to the invention or the building material mixes formed by addition of water therefore have the advantage that they have a particularly high yield and are particularly economically advantageous. Further customary additives such as air pore formers, antifoams, polyacrylamides, acrylate-based thickeners, functional sheet silicates, plasticizers customary for cement-containing systems, for example polycarboxylate ethers (PCE), melamine-formal dehydesulphonates (MFS), β-naphthalene-formaldehydesulphonates (BNS) and fibres such as cellulose fibres or synthetic fibres (e.g. aramid fibres) can also be present in the dry mixes of the invention.

In a specific embodiment of the invention, the dry mixes comprise g) from 0.1 to 1.5 percent by weight of a water-soluble copolymer which contains sulpho groups and comprises g-i) from to 96 molpercent of structural units of the general formula (I)

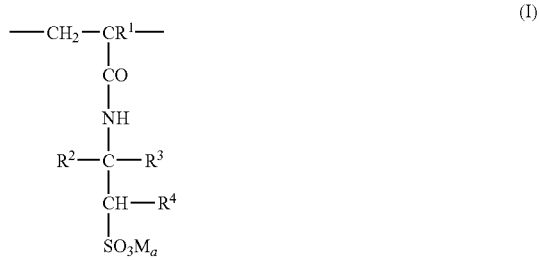

(I)

where
$R^1$ is as defined above,
$R^2$, $R^3$, $R^4$ are each as defined above,
M and a are as defined above, g-ii) from 3 to 96 molpercent of structural units of the general formula (II)

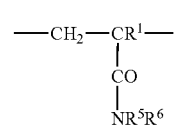

(II)

where
$R^1$ is as defined above,
$R^5$ and $R^6$ are each as defined above,
and at least one further structural unit selected from among g-iii) from 0.001 to 10 molpercent of structural units of the general formula (IV)

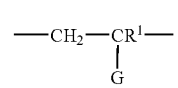

(IV)

where
$R^1$ is as defined above,
the radicals
G are identical or different and are each —COO$(C_nH_{2n}O)_p$—$R^{11}$ or —$(CH_2)_q$—O$(C_nH_{2n}O)_p$—$R^{11}$,
the radicals
$R^{11}$ are identical or different and are each

or an unsaturated or saturated, linear or branched aliphatic alkyl radical having from 10 to 40 carbon atoms,
the radicals
$R^{12}$ are identical or different and are each hydrogen, a $C_1$-$C_6$-alkyl group, an arylalkyl group having a $C_1$-$C_{12}$-alkyl radical and a $C_6$-$C_{14}$-aryl radical,
the indices
n are identical or different and are each an integer from 2 to 4,
the indices
p are identical or different and are each an integer 0 to 200,
the indices
q are identical or different and are each an integer from 0 to 20,
the indices
r are identical or different and are each an integer from 0 to 3,
and
g-iv) from 0.1 to 30 molpercent of structural units of the general formula (V)

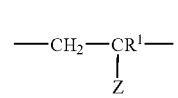

(V)

where
R$^1$ is as defined above,
Z is —(CH$_2$)$_q$—O(C$_n$H$_{2n}$O)$_p$—R$^{13}$,
n, p and q are as defined above,
the radicals
R$^{13}$ are identical or different and are each hydrogen or a C$_1$-C$_4$-alkyl radical.

The water-soluble copolymers containing sulpho groups g) will be described in more detail below. The copolymers g) represent further water retention agents and differ from the above-described polysaccharide-based water retention agents and the preferably water-insoluble anionic, superabsorbent copolymers f$_a$) which have likewise been described above. The water-soluble copolymers containing sulpho groups are preferably used in powder form in the dry mix. They contain structural units of the general formulae I and II, with at least one further structural unit selected from among the structural units IV and V being present. Specifically, this means that the copolymers may comprise structural units of the general formulae I, II, IV or structural units of the general formulae I, II, V or structural units of the general formulae I, II, IV, V. The proportion of structural units of the general formulae I and II in the water-soluble copolymer containing sulpho groups is in each case in the range from 3 to 96 molpercent, that of the structural units of the general formula IV is in the range from 0.001 to 10 molpercent and that of the structural units of the general formula V is in the range from 0.1 to 30 molpercent. Preferred copolymers contain from 30 to 80 molpercent of structural units of the general formula I and from 5 to 50 molpercent of structural units of the general formula II, also from 0.1 to 5 molpercent of structural units of the general formula IV or from 0.2 to 15 molpercent of structural units of the general formula V, or else both structural units IV and V in the corresponding, abovementioned amounts.

The structural unit of the general formula I is preferably derived from monomers such as 2-acrylamido-2-methylpropanesulphonic acid, 2-methacrylamido-2-methylpropanesulphonic acid. 2-acrylamidobutanesulphonic acid, 2-acrylamido-2,4,4-trimethyl-pentanesulphonic acid and their respective salt compounds. Particular preference is given to 2-acrylamido-2-methylpropanesulphonic acid and its salt compounds.

The structural unit of the general formula II is preferably derived from monomers such as acrylamide, methacrylamide, N-methylacrylamide, N,N-dimethylacrylamide, N-ethylacrylamide, N-cyclohexylacrylamide, N-benzylacrylamide, N-methylol-acrylamide, N-tert-butylacrylamide.

The structural unit of the general formula IV is preferably derived from monomers such as tristyrylphenolpolyethylene glycol 1100 methacrylate, behenylpolyethylene glycol 1100 methacrylate, stearylpolyethylene glycol 1100 methacrylate, tristyrylphenol-polyethylene glycol 1100 acrylate, tristyrylphenolpolyethene glycol 1100 monovinyl ether, behenylpolyethene glycol 1100 monovinyl ether, stearylpolyethene glycol 1100 monovinyl ether, tristyrylphenolpolyethylene glycol 1100 vinyloxybutyl ether, behenylpolyethylene glycol 1100 vinyloxybutyl ether, tristyrylphenolpolyethylene glycol-block-propylene glycol allyl ether, behenylpolyethylene glycol-block-propylene glycol allyl ether, stearylpolyethylene glycol-block-propylene glycol allyl ether.

The structural unit of the general formula V is preferably derived from monomers such as allylpolyethylene glycol (350 to 2000), methylpolyethylene glycol (350 to 2000) monovinyl ether, polyethylene glycol (500 to 2000) vinyloxybutyl ether, polyethylene glycol-block-propylene glycol (500 to 5000) vinyloxybutyl ether and methyl-polyethylene glycol-block-propylene glycol allyl ether.

The copolymers used according to the invention are prepared in a manner known per se by linking of the monomers derived from the corresponding structural units I, II, IV and V by means of free-radical, bulk, solution, gel, emulsion, dispersion or suspension polymerization. It has been found to be advantageous to set the number of structural units so that the water-soluble copolymers containing sulpho groups g) have a number average molecular weight of from 50 000 to 20 000 000.

The water-soluble copolymers containing sulpho groups g) are preferably present in the dry mix in an amount of from 0.1 to 1.5% by weight, particularly preferably from 0.3 to 1.2% by weight and very particularly preferably from 0.5 to 1.0% by weight.

In a further specific embodiment of the invention, the dry mixes of the invention comprise h) from 0.1 to 1.5 percent by weight of a water-soluble cationic copolymer comprising h-i) from 5 to 60 molpercent of structural units of the general formula (VI),

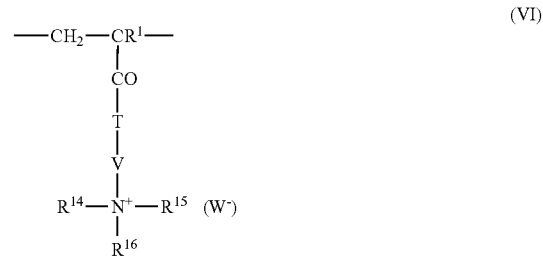

where
R$^1$ is as defined above,
R$^{14}$ and R$^{15}$ are in each case identical or different and are each, independently of one another, hydrogen, an aliphatic hydrocarbon radical having from 1 to 20 carbon atoms, a cycloaliphatic hydrocarbon radical having from 5 to 8 carbon atoms and/or an aryl radical having from 6 to 14 carbon atoms, the radicals
R$^{16}$ are identical or different and are each a substituent identical to R$^{14}$ or R$^{15}$, —(CH$^2$)$_x$—SO$_3$L$_a$,

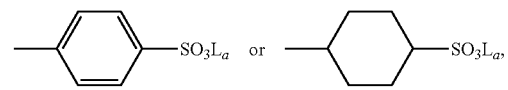

the ions
L are identical or different and are each a monovalent or divalent metal cation, ammonium cation or quaternary ammonium cation (NR$_1$R$_{14}$R$_{15}$R$_{16}$)$^+$,
the indices
a are identical or different and are each ½ or 1,
the radicals
T are identical or different and are each oxygen, —NH and/or —NR$^{14}$,
the radicals
V are identical or different and are each —(CH$_2$)$_m$—,

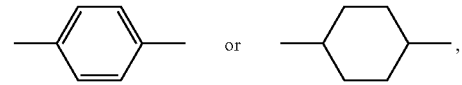

the indices
m are identical or different and are each an integer from 1 to 6,
the ions
W⁻ are identical or different and are each a halogen atom, $C_1$-$C_4$-alkylsulphate or $C_1$-$C_4$-alkylsulphonate, h-ii) from 20 to 80 molpercent of a structural unit having the general formulae (VIIa) and/or (VIIb):

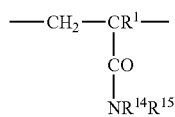
(VIIa)

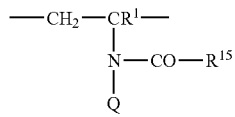
(VIIb)

where
the radicals
Q are identical or different and are each hydrogen or —CHR$^{14}$R$^{17}$.
R$^1$, R$^{14}$, R$^{15}$ are each as defined above, with the proviso that when Q is not hydrogen then R$^{14}$ and R$^{15}$ in the general formula (VIIb) can together form a —CH$_2$—(CH$_2$)$_y$— methylene group so that the general formula (VIIb) represents the following structure:

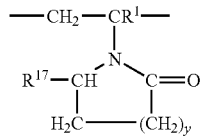

where
the radicals
R$^{17}$ are identical or different and are each a hydrogen atom, a $C_1$-$C_4$-alkyl radical, a carboxylic acid group or a carboxylate group —COOL$_a$, where the indices y are identical or different and are each an integer from 1 to 4, and L and a are each as defined above, h-iii) from 0.01 to 3 molpercent of structural units of the general formula (VIII)

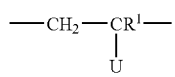
(VIII)

where
the radicals
U are identical or different and are each —COO(C$_n$H$_{2n}$O)$_s$—R$^{18}$ or —(CH$_2$)$_q$—O(C$_n$H$_{2n}$O)$_s$—R$^{18}$,
the indices
n are identical or different and are each an integer from 2 to 4,
the indices
s are identical or different and are each an integer from 1 to 200,
the indices
q are identical or different and are each an integer from 0 to 20,
the radicals
R$^{18}$ are identical or different and are each

the radicals
R$^{19}$ are identical or different and are each hydrogen, a $C_1$-$C_6$-alkyl group or an arylalkyl group having a $C_1$-$C_{12}$-alkyl radical and a $C_6$-$C_{14}$-aryl radical,
the indices
z are identical or different and are each an integer from 1 to 3 and
R$^1$ is as defined above.

The cationic copolymers h) will be described in more detail below.

The water-soluble cationic copolymers h) represent further water retention agents and differ from the above-described polysaccharide-based water retention agents and the preferably water-insoluble cationic, superabsorbent copolymers f$_b$) which have likewise been described above. The water-soluble cationic copolymers are preferably used in powder form in the dry mix. These water-soluble cationic copolymers enable considerable improvements in the water retention to be achieved in aqueous building material systems based on hydraulic binders such as cement even in the case of high salt contents. In addition, the rheological modification, the water retention capacity, the stickiness and the processing properties can be optimally set for the respective application via the composition of the copolymers.

The good solubility in water which is necessary for use of the copolymers in aqueous building material applications is ensured, in particular, by the cationic structural unit of the general formula VI. The uncharged structural unit of the general formulae VIIa and/or VIIb is required mainly for construction of the main chain and achievement of suitable chain lengths, while the hydrophobic structural units of the general formula VIII make associative thickening, which is advantageous for the desired product properties, possible.

In the cationic copolymers h), the structural unit of the general formula VI preferably results from polymerization of one or more monomer species selected from the group consisting of [2-(acryloyloxy)ethyl]trimethylammonium salts, [2-(methacryloyloxy)-ethyl]trimethylammonium salts, [3-(acryloylamino)propyl]trimethylammonium salts. [3-(methacryloylamino)propyl]trimethylammonium salts, N-(3-sulphopropyl)-N-methyl-acryloxyethyl-N,N-dimethylammonium betaine, N-(3-sulphopropyl)-N-methyacryl-amidopropyl-N,N-dimethylammonium betaine and/or 1-(3-sulphopropyl)-2-vinyl-pyridinium betaine. The salts mentioned are preferably present as halides or methosulphates. Particular preference is given to [3-(acryloylamino)propyl]trimethylammonium salts and/or [3-(methacryloylamino)propyl]trimethylammonium salts. Very particular preference is given to [3-(acryloylamino)propyl]trimethylammonium chloride (DIMAPA-Quat) and/or [3-(methacryloylamino)propyl]trimethylammonium chloride (MAPTAC).

It is in principle practicable to replace up to about 15 molpercent of the structural units of the general formula VI by further cationic structural units which are derived from N,N-dimethyldiallylammonium chloride and N,N-diethyldiallylammonium chloride.

The structural unit of the general formula VIIa preferably results from polymerization of one or more of the monomer species acrylamide, methacrylamide, N-methyl-acrylamide, N,N-dimethylacrylamide, N-ethylacrylamide, N-cyclohexylacrylamide, N-benzylacrylamide, N-methylolacrylamide, N-tert-butyl acrylamide, etc. Examples of monomers as basis of the structure VIIb are N-methyl-N-vinylformamide, N-methyl-N-vinylacetamide, N-vinylpyrrolidone, N-vinylcaprolactam and/or N-vinylpyrrolidone-5-carboxylic acid.

The structural unit of the general formula VIII preferably results from polymerization of one or more of the monomer species tristyrylphenolpolyethylene glycol 1100 methacrylate, tristyrylphenolpolyethylene glycol 1100 acrylate, tristyrylphenolpolyethene glycol 1100 monovinyl ether, tristyrylphenolpolyethylene glycol 1100 vinyloxybutyl ether and/or tristyrylphenolpolyethylene glycol-block-propylene glycol allyl ether.

In a preferred embodiment of the invention, the structural units of the general formula VI are present in the copolymer in a proportion of from 15 to 50 molpercent, those of the general formula VIIIa and/or VIIb are present in a proportion of from 30 to 75 molpercent and those of the general formula VIII are present in a proportion of from 0.03 to 1 molpercent.

In addition to the abovementioned structural elements of the general formulae VI, VIIa and/or VIIb and VIII, it is also possible for up to 40 molpercent of further structural elements which are preferably derived from [2-(methacryloyloxy) ethyl]diethylamine, [3-(acryloylamino)propyl]dimethylamine and/or [3-(methacryloylamino)propyl]-dimethylamine to be present in the copolymers. The copolymers h) according to the invention are preferably prepared in a manner known per se by linking of the monomers forming the structural units of the general formulae VI, VIIa and/or VIIb and VIII and if appropriate further monomers by means of free-radical polymerization. Since the products used according to the invention are water-soluble copolymers, polymerization in the aqueous phase, polymerization in an inverted emulsion or polymerization in inverse suspension is preferred. The copolymers are advantageously prepared by gel polymerization in the aqueous phase.

It has been found to be advantageous to set the number of structural units so that the water-soluble cationic copolymers h) have a number average molecular weight of from 50 000 to 20 000 000.

The water-soluble cationic copolymers h) are preferably present in the dry mix in an amount of from 0.1 to 1.5% by weight, particularly preferably from 0.3 to 1.2% by weight and very particularly preferably from 0.5 to 1.0% by weight.

Mixing of the dry mixes of the invention with water gives ready-to-use building material mixes. Compared to dry mixes which do not contain any superabsorbent copolymers, these have an increased water requirement. Otherwise, the water requirement of the building material systems is determined by the type and amount of the components of the dry mix and the respective requirements of the use.

The building material mix of the invention is preferably used as tile adhesive in accordance with DIN EN 12004, as sealing slurry, joint filler in accordance with EN 13888, repair mortar in accordance with EN 1504, knifing filler, parquet adhesive, screed, plaster or render in accordance with EN 998-1 and as adhesive mortar or reinforcing mortar for composite thermal insulation systems (CTIS) in accordance with EN 13499 and EN 13500. For the purposes of the present invention, repair mortars are, for example, mortars for the repair or replacement of damaged concrete. Knifing fillers serve, for example, for final working of a substrate to obtain flat surfaces (walls or ceilings). Composite thermal insulation systems are insulation systems which are usually employed on the building site using factory-made thermal insulation materials. They are fixed in place by means of adhesive mortar; if mechanical fastening (reinforcement) is to be applied, the system is referred to as reinforcing mortar.

EXAMPLES

I Test Methods
Determination of the Uptake Capacity of the Superabsorbent Copolymers The determination of the uptake capacity of the superabsorbents according to the invention is carried out in accordance with the standard edana 440.2-02 developed for the hygiene industry with modification of the method, i.e. replacement of the 0.9 percent strength sodium chloride solution specified there as test liquid by a one percent strength calcium formate solution. This method, also referred to as "tea bag test", is carried out by welding a defined amount (about 200 mg) of superabsorbent polymer into a tea bag and dipping it into a one percent strength calcium formate solution for 30 minutes. The tea bag is subsequently allowed to drip for five minutes and is weighed. A tea bag without superabsorbent polymer is concomitantly tested as blank. To calculate the uptake capacity, the following formula is used:

Uptake capacity=(final weight−blank−initial weight)/initial weight(g/g)

Determination of the Proportion of Extractable Material in the Superabsorbent Copolymers The proportion of extractable material is determined by extraction of the superabsorbent copolymer in 0.9 percent strength sodium chloride solution with subsequent determination of total organic carbon (TOC determination). For this purpose, 1.0 g of the superabsorbent polymer is left to stand for sixteen hours in one litre of 0.9 percent strength by weight sodium chloride solution and subsequently filtered off. After determination of the TOC content of the filtrate, the proportion of extractable material is calculated via the known carbon content of the superabsorbent polymer.

II Synthesis of Superabsorbent Copolymers
Copolymer 1 (Anionic Superabsorbent Copolymer)

160 g of water were placed in a 2 l three-neck flask provided with stirrer and thermometer and 352.50 g (0.74 mol, 28 mol %) of 2-acrylamido-2-methylpropane-sulphonic acid sodium salt (50% strength by weight solution in water), 286.40 g (2.0 mol, 72 mol %) of acrylamide (50% strength by weight solution in water) and 0.3 g (0.0021 mol, 0.08 mol %) of methylenebisacrylamide were subsequently added in succession. After setting the pH to 7 by means of 20% strength sodium hydroxide solution and flushing with nitrogen for thirty minutes, the mixture was cooled to about 5° C. The solution was transferred to a plastic container having dimensions (w·d·h) of 15 cm·10 cm·20 cm and 16 g of one percent strength 2,2'-azobis(2-amidinopropane) dihydrochloride solution, 20 g of one percent strength sodium peroxodisulphate solution, 0.7 g of one percent strength Rongalit C solution, 16.2 g of 0.1 percent strength tert-butyl hydroperoxide solution and 2.5 g of 0.1 percent strength Fe(II) sulphate heptahydrate solution were subsequently added in succession. The copolymerization was initiated by radiation with UV light (two Philips tubes; Cleo Performance 40 W). After about two hours, the now hard gel is taken from the plastic container and cut into cubes having an edge length of about 5 cm by means of scissors. Before the gel cubes were comminuted by means of a conventional mincer, they were painted with the release agent Sitren 595 (polydimethylsiloxane emulsion; from Goldschmidt). The release agent was a polydimethylsiloxane emulsion which was diluted with water in a ratio of one to twenty.

The resulting gel granules of copolymer 1 were uniformly distributed over a drying mesh and dried to constant weight at about 120-140° C. in a convection drying oven. This gave about 375 g of white, hard granules which were converted into a pulverulent state by means of a centrifugal mill. The average particle diameter of the polymer powder was from 30 to 50 µm and the proportion of particles which did not pass a sieve having a mesh size of 63 µm was less than 2% by weight.

The uptake capacity of the copolymer 1 in a one percent strength calcium formate solution is 32 g/g and the proportion of extractable material is 7.0 percent. The product has been found to be shear stable and, in particular, displays no after-thickening, e.g. in the tile adhesive.

The copolymer 1 reaches its maximum water uptake capacity within four minutes, which corresponds approximately to the customary times over which cement-containing building material mixes are mixed with water.

Copolymer 2 (Cationic Superabsorbent Copolymer)

276.5 g of water were placed in a 2 l three-neck flask provided with stirrer and thermometer. 246.90 g (0.72 mol, 27 mol %) of DIMAPA-Quat (60% strength by weight solution in water) 262.60 g (1.84 mol, 73 mol %) of acrylamide (50% strength by weight solution in water) and 0.3 g (0.0021 mol, 0.08 mol %) of methylenebisacrylamide were subsequently added in succession. After setting the pH to 7 by means of 20% strength sodium hydroxide solution and flushing with nitrogen for thirty minutes, the mixture was cooled to about 5° C. The solution was transferred to a plastic container having dimensions (w·d·h) of 15 cm·10 cm·20 cm and 16 g of one percent strength 2,2'-azobis(2-amidinopropane) dihydrochloride solution, 20 g of one percent strength sodium peroxodisulphate solution, 0.7 g of one percent strength Rongalit C solution, 16.2 g of 0.1 percent strength tert-butyl hydroperoxide solution and 2.5 g of 0.1 percent strength Fe(II) sulphate heptahydrate solution were subsequently added in succession. The polymerization was initiated by radiation with UV light (two Philips tubes; Cleo Performance 40 W). After about two hours, the hard gel was taken from the plastic container and processed further in the same way as described above for copolymer 1. This gave about 375 g of white, hard granules which were converted into a pulverulent state by means of a centrifugal mill. The average particle diameter of the polymer powder was from 30 to 50 µm and the proportion of particles which did not pass a sieve having a mesh size of 63 µm was less than 2% by weight. The uptake capacity of the copolymer 2 in a one percent strength calcium formate solution is 29 g/g and the proportion of extractable material is 9.0 percent.

Comparative Polymer 1

The comparative polymer 1, viz. Luquasorb® 3746 SX from BASF AG, is a crosslinked partially neutralized sodium polyacrylate. In a one percent strength calcium formate solution, the gel collapses, i.e. virtually complete loss of the absorption capacity occurs.

Comparative Polymer 2

The comparative polymer 2, viz. Luquasorb® AF 2 from BASF AG, is a crosslinked copolymer of acrylamide and acrylic acid, with the acrylic acid having been neutralized by means of sodium hydroxide. The commercial product Luquasorb® AF 2 (1000-3000 µm) was milled by means of a centrifugal mill so that the proportion of particles which do not pass a sieve having a mesh size of 63 µm was less than 2% by weight. The product was prepared by the gel polymerization process.

In a one percent calcium formate solution, the uptake capacity is 10 g/g.

III Use Tests

Tile Adhesive Mortar (Table 1)

To test the tile adhesive mortar, the "slipping of a stoneware tile" test in accordance with DIN EN 1308 was carried out. When the requirement of class "T" in accordance with DIN EN 12004, namely a slippage of less than 0.5 mm, was fulfilled, the consistency of the mixture was considered to be acceptable in practice for tile adhesives.

In corresponding trials, 1 kg of the hydraulic tile adhesive mortar of Table 1 was in each case mixed with the appropriate amount of water in a standard mixer. The maximum amount of water which still gives a consistency which meets the above-mentioned nonslip requirements was determined in each case. These values are reported as water/dry mix ratio in Table 1.

The results of the tests are summarized in Table 1.

TABLE 1

| Hydraulic tile adhesive mortar | | | | | |
|---|---|---|---|---|---|
| | Comp. | Example 1 (% by wt.) | Comp. Ex. 1 (% by wt.) | Comp. Ex. 2 (% by wt.) | Comp. Ex. 3 (% by wt.) |
| Composition | | | | | |
| CEM II A 42.5 R | a) | 74.83 | 75.56 | 74.83 | 74.83 |
| Siliceous lightweight filler, particle size up to 0.5 mm (density: 400 g/l) | b) | 16.01 | 16.17 | 16.01 | 16.01 |
| Vinyl-acetate ethylene copolymer[1] (minimum film formation temperature: 4° C.) | c) | 3.22 | 3.25 | 3.22 | 3.22 |
| Hydroxypropylmethylcellulose[2] | d) | 0.92 | 0.93 | 0.92 | 0.92 |
| Calcium formate | e) | 1.74 | 1.76 | 1.74 | 1.74 |
| Copolymer 1 | $f_a$) | 0.96 | 0.00 | 0.00 | 0.00 |
| Comparative polymer 1 | | 0.00 | 0.00 | 0.96 | 0.00 |
| Comparative polymer 2 | | 0.00 | 0.00 | 0.00 | 0.96 |
| Cellulose fibres (200 µm) | | 1.39 | 1.41 | 1.39 | 1.39 |
| Na bentonite | | 0.87 | 0.88 | 0.87 | 0.87 |
| $FeSO_4 \cdot 7H_2O$ | | 0.05 | 0.05 | 0.05 | 0.05 |

TABLE 1-continued

| | | Hydraulic tile adhesive mortar | | | |
|---|---|---|---|---|---|
| | Comp. | Example 1 (% by wt.) | Comp. Ex. 1 (% by wt.) | Comp. Ex. 2 (% by wt.) | Comp. Ex. 3 (% by wt.) |
| Test results | | | | | |
| Slippage test in accordance with EN 1308 (requirement fulfilled) | | <0.5 mm | <0.5 mm | <0.5 mm | <0.5 mm |
| Water/dry mix (g/kg) | | 760 | 560 | 580 | 610 |
| Fresh mortar density (kg/l) | | 1.15 | 1.25 | 1.23 | 1.21 |
| Yield (volume of the dry mix mixed with water/mass of the dry mix) (l/kg) | | 1.53 | 1.25 | 1.28 | 1.31 |
| Correctability of a stoneware tile after 10 minutes | | good-average | average-difficult | good-average | good-average |
| Skin formation time (min) | | 22 | 14 | 22 | 20 |

[1] Vinnapas ® RE 5028, Wacker Chemie AG, Burghausen
[2] Culminal ® MHPC 60 000 (the viscosity of a 2% solution in water at room temp. is 60 000 mPas). from Aqualon, Düsseldorf In contrast to Comparative Examples 1 (without superabsorbent) and 2, 3 (with comparative superabsorbents respectively), the maximum amount of water which can be used in the case of the superabsorbent according to the invention copolymer 1 of Example 1 while still fulfilling the standard 1308 (slippage resistance of tile adhesive mortars) is significantly higher. The yield is accordingly significantly higher. The water requirement in Comparative Examples 2 and 3 is close to that of Comparative Example 1 (without superabsorbent), i.e. the superabsorbents which are not according to the invention of Comparative Examples 2 and 3 have only a very small water uptake capacity.

The correctability of a stoneware tile is a test which indicates the ease or difficulty with which the position of a strongly water-absorbing tile can be corrected after a particular time interval (usually 5, 10 or 15 minutes) after being placed on the adhesive bed. The correctability after 10 minutes is improved at least over Comparative Example 1.

The skin formation time is likewise improved over Comparative Example 1 and, despite the greater amount of make-up water in Example 1, a skin formation time similar to Comparative Example 2 was found. The skin formation time is defined as the time after making-up of the tile adhesive mortar after which a skin is formed on the bed of adhesive. It is determined visually. The air pore content of the tile adhesives in Table 1 ranged from 21 to 24 percent.

At a constant mass ratio of water/dry mix of 360 g/kg, at which the requirements in respect of the slippage resistance of the tiles are still fulfilled, the adhesive pull strengths in accordance with EN 1348 after various storage conditions and the adhesive open time were likewise determined for tile adhesive mortars in a second trial. Table 2 gives an overview of the results obtained.

TABLE 2

| | | Hydraulic tile adhesive mortar | | | | | | |
|---|---|---|---|---|---|---|---|---|
| | Comp. | Ex. 2 % by wt. | Ex. 3 % by wt. | Ex. 4 % by wt. | Ex. 5 % by wt. | Comp. Ex. 3 % by wt. | Comp. Ex. 4 % by wt. | Comp. Ex. 5 % by wt. |
| Composition | | | | | | | | |
| Portland cement CEM I 52.5 | a) | 37 | 37 | 37 | 37 | 37 | 37 | 37 |
| Silica sand, 0 to 0.5 mm | b) | 53.6 | 53.65 | 53.8 | 53.75 | 52.0 | 53.5 | 53.05 |
| Ground limestone | b) | 6 | 6 | 6 | 6 | 6 | 6 | 6 |
| Vinyl acetate-ethylene copolymer[1] (minimum film formation temp.: 4° C.) | c) | 1.5 | 1.5 | 1.5 | 1.5 | 3 | 1.5 | 1.5 |
| Hydroxypropylmethyl-cellulose[3] | d) | 0.5 | 0.4 | 0.4 | 0.3 | 0.6 | 0.6 | 0.6 |
| Starch ether[4] | d) | 0.1 | 0.1 | 0.1 | 0.1 | 0.1 | 0.1 | 0.1 |
| Accelerator (calcium formate) | e) | 0.7 | 0.7 | 0.7 | 0.7 | 0.7 | 0.7 | 0.7 |
| Copolymer 1 (anionic) | $f_a$) | 0.3 | 0.45 | 0 | 0 | 0 | 0 | 0 |
| Copolymer 2 (cationic) | $f_b$) | 0 | 0 | 0.3 | 0.45 | 0 | 0 | 0 |
| Comparative polymer 1 | | 0 | 0 | 0 | 0 | 0 | 0 | 0.45 |
| Cellulose fibres | | 0.3 | 0.2 | 0.2 | 0.2 | 0.6 | 0.6 | 0.6 |
| Water/dry mix (g/kg) | | 360 | 360 | 360 | 360 | 360 | 360 | 360 |
| Test results | | | | | | | | |
| Adhesive pull strengths in accordance with EN1348 | | N/mm² | N/mm² | N/mm² | N/mm² | N/mm² | N/mm² | N/mm² |
| Dry storage: 28 days at room temperature | | 1.13 | 1.28 | 1.10 | 1.30 | 1.05 | 0.72 | 0.75 |
| Wet storage: 7 days dry, 21 days moist (in each case at room temperature) (RT) | | 1.50 | 1.49 | 1.50 | 1.48 | 1.61 | 1.60 | 1.52 |

TABLE 2-continued

Hydraulic tile adhesive mortar

|  | Comp. | Ex. 2 % by wt. | Ex. 3 % by wt. | Ex. 4 % by wt. | Ex. 5 % by wt. | Comp. Ex. 3 % by wt. | Comp. Ex. 4 % by wt. | Comp. Ex. 5 % by wt. |
|---|---|---|---|---|---|---|---|---|
| Hot storage: 14 days at RT, 14 days at 70° C. 1 day at RT |  | 1.12 | 1.22 | 1.15 | 1.17 | 1.17 | 0.78 | 0.75 |
| Adhesive open time in accordance with EN 12004 (after 30 min) |  | 0.65 | 0.82 | 0.57 | 0.79 | 0.55 | 0.21 | 0.25 |

[1] Vinnapas ® RE 5028, Wacker Chemie AG, Burghausen
[3] Culminal ® MHPC 20 000 (the viscosity of a 2% solution in water at room temperature is 20 000 mPas). from Aqualon, Düsseldorf
[4] Tylovis ® SE7. from SE Tylose GmbH & Co. KG, Wiesbaden As a result of the use of the anionic (Examples 2 and 3) superabsorbent copolymers according to the invention and the cationic (Examples 4 and 5) superabsorbent copolymers according to the invention, the amount of redispersible polymer powder (vinyl acetate-ethylene copolymer) was able to be halved at the same ratio of water to dry mix without a deterioration in the adhesive pull strengths as in Comparative Examples 4 and 5 occurring. Particularly in the case of dry storage, hot storage and in the testing of the adhesive pull strengths after 30 minutes (adhesive open time), the adhesive pull strengths for Comparative Examples 4 and 5 deteriorated significantly. The comparative polymer 1 (Comparative Example 5) thus does not have an effect as produced according to the invention. Comparative Example 3 shows that good adhesive pull strengths which are similar to those in the examples according to the invention can be achieved only by the use of higher and therefore economically unfavourable amounts of redispersible polymer powder. As a further advantage, the amounts of cellulose ether used could be reduced somewhat in the examples according to the invention. The results for the adhesive open time (Examples 2 to 5) are somewhat better than in Comparative Example 3 in which a large amount of redispersible polymer powder is used; compared to Comparative Examples 4 and 5, they are improved significantly.

Composite Thermal Insulation Systems (Table 3)

The adhesive pull strengths and the adhesive open time were likewise determined for CTISs. The results are summarized in Table 3.

TABLE 3

CTIS system

| Composition |  | Comp. | Ex. 6 % by wt. | Ex. 7 % by wt. | Ex. 8 % by wt. | Ex. 9 % by wt. | Comp. Ex. 6 % by wt. | Comp. Ex. 7 % by wt. |
|---|---|---|---|---|---|---|---|---|
| Portland cement (e.g. CEM I 42.5 R) | a) |  | 25.0 | 25.0 | 25.0 | 25.0 | 25.0 | 25.0 |
| Silica sand or ground limestone (particle size up to 0.5 mm) | b) |  | 72.5 | 72.35 | 72.5 | 72.35 | 71.8 | 72.8 |
| Vinyl acetate-ethylene copolymer[1] (minimum film formation temp.: 4° C.) | c) |  | 1.0 | 1.0 | 1.0 | 1.0 | 2.0 | 1.0 |
| Hydroxypropylmethyl-cellulose[3] | d) |  | 0.2 | 0.2 | 0.2 | 0.2 | 0.2 | 0.2 |
| Calcium formate | e) |  | 1.0 | 1.0 | 1.0 | 1.0 | 1.0 | 1.0 |
| Copolymer 1 (anionic) | $f_a$) |  | 0.3 | 0.4 | 0 | 0 | 0 | 0 |
| Copolymer 2 (cationic) | $f_b$) |  | 0 | 0 | 0.3 | 0.4 | 0 | 0 |
| Water/dry mix (g/kg) |  |  | 250 | 250 | 250 | 250 | 250 | 250 |
| Adhesive pull strengths in accordance with EN 1348 |  |  | $N/mm^2$ | $N/mm^2$ | $N/mm^2$ | $N/mm^2$ | $N/mm^2$ | $N/mm^2$ |
| Dry storage: 28 days at room temperature |  |  | 0.8 | 0.85 | 0.75 | 0.8 | 0.7 | 0.3 |
| Wet storage: 7 days dry. 21 days moist (in each case at room temperature) (RT) |  |  | 0.6 | 0.6 | 0.6 | 0.55 | 0.6 | 0.6 |
| Hot storage: 14 days at RT, 14 days at 70° C., 1 day at RT |  |  | 0.6 | 0.7 | 0.6 | 0.6 | 0.5 | 0.2 |
| Adhesive open time in accordance with EN 12004 (after 20 min) |  |  | 0.5 | 0.6 | 0.5 | 0.5 | 0.5 | 0.2 |

[1] Vinnapas ® RE 5028. from Wacker Chemie AG, Burghausen
[3] Culminal ® MHPC 20 000 (the viscosity of a 2% solution in water at room temperature is 20 000). from Aqualon, Düsseldorf In the case of the CTIS adhesive and reinforcing mortars according to the invention, the use of the anionic copolymer 1 according to the invention (Examples 6 and 7) or of the cationic polymer 2 according to the invention (Examples 8 and 9) and halving of the amount of redispersible polymer powder (compared to Comparative Example 6) does not have any adverse effects on the adhesive pull strengths. In particular, the adhesive pull strengths do not deteriorate during dry storage and during hot storage, in contrast to Comparative Example 7. Comparative Example 6 is less economically favourable because of the relatively large amounts of redispersible dispersion powder. The adhesive open time and the adhesive pull strengths after 20 minutes are significantly improved in Examples 6 to 9 according to the invention compared to Comparative Example 7.

The invention claimed is:

1. Hydraulically setting dry mix comprising
a) from 10 to 95 percent by weight of a cement-containing, hydraulic binder,
b) from 5 to 75 percent by weight of inorganic fillers and/or organic fillers,
c) from 0.5 to 10 percent by weight of a redispersible polymer powder,
d) from 0.1 to 1.5 percent by weight of a water retention agent which is based on polysaccharide structures,
e) from 0.3 to 4.0 percent by weight of at least one setting accelerator selected from the group consisting of calcium formate, calcium chloride, and calcium nitrate; and either
$f_a$) from 0.02 to 2.0 percent by weight of a water-insoluble anionic pulverulent copolymer, with the copolymer comprising
$f_a$-i) from 10 to 70 mol percent of structural units containing a sulphonic acid group and having the general formula (I)

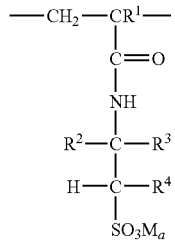

where
the radicals $R^1$ are identical or different and are each hydrogen or a methyl radical,
the radicals $R^2$, $R^3$, $R^4$ are in each case identical or different and are each, independently of one another, hydrogen, an aliphatic, branched or unbranched hydrocarbon radical having from 1 to 6 carbon atoms or an aromatic hydrocarbon radical having from 6 to 14 carbon atoms,
the ions M are identical or different and are each hydrogen, a monovalent or divalent metal cation or an ammonium ion,
the indices a are identical or different and are each either ½ or 1,
$f_a$-ii) from 30 to 90 mol percent of structural units containing a (meth)acrylamido group and having the general formula (II)

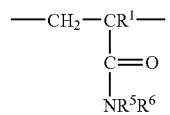

where
the radicals $R^1$ are identical or different and are each hydrogen or a methyl radical,
the radicals $R^5$ and $R^6$ are in each case identical or different and are each, independently of one another, hydrogen, a branched or unbranched aliphatic hydrocarbon radical having from 1 to 20 carbon atoms, a cycloaliphatic hydrocarbon radical having from 5 to 8 carbon atoms or an aryl radical having from 6 to 14 carbon atoms,
$f_a$-iii) from 0.03 to 1 mol percent of structural units derived from monomer compounds which have more than one free-radically polymerizable, ethylenically unsaturated vinyl group,
or, as an alternative to $f_a$),
$f_b$) from 0.02 to 2.0 percent by weight of a water-insoluble cationic pulverulent copolymer with the copolymer comprising
$f_b$-i) from 10 to 70 mol percent of cationic units containing a quaternized nitrogen atom and having the general formula (III)

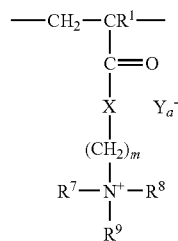

where
the radicals $R^1$ are identical or different and are each hydrogen or a methyl radical,
the radicals $R^7$, $R^8$, $R^9$, $R^{10}$ are in each case identical or different and are each, independently of one another, hydrogen, a branched or unbranched aliphatic hydrocarbon radical having from 1 to 20 carbon atoms, a cycloaliphatic hydrocarbon radical having from 5 to 8 carbon atoms or an aryl radical having from 6 to 14 carbon atoms,
the indices m are identical or different and are each an integer from 1 to 6,
the radicals X are identical or different and are each oxygen or N—$R^{10}$,
the ions $Y^-_a$ are identical or different and are each a halide, $C_1$-$C_4$-alkylsulphate, $C_1$-$C_4$-alkylsulphonate or sulphate,
the indices a are identical or different and are each either ½ or 1,
$f_b$-ii) from 30 to 90 mol percent of structural units containing a (meth)acrylamido group and having the general formula (II)

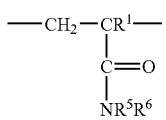

where
the radicals $R^1$ are identical or different and are each hydrogen or a methyl radical,
the radicals $R^5$ and $R^6$ are in each case identical or different and are each, independently of one another, hydrogen, a branched or unbranched aliphatic hydrocarbon radical having from 1 to 20 carbon atoms, a cycloaliphatic hydrocarbon radical having from 5 to 8 carbon atoms or an aryl radical having from 6 to 14 carbon atoms,
$f_b$-iii) from 0.03 to 1 mol percent of structural units derived from monomer compounds which have more than one free-radically polymerizable, ethylenically unsaturated vinyl group.

2. Hydraulically setting dry mix according to claim 1, wherein the cement-containing hydraulic binder is present as portland cement, and is optionally selected from among the types CEM I, II, III, IV and V, and/or is present as alumina cement.

3. Hydraulically setting dry mix according to claim 1, wherein the inorganic fillers are present as silica sand and/or ground limestone and/or are present as lightweight fillers, optionally hollow glass microspheres, foamed glass, aluminosilicates, perlites or expanded clay, and/or are present as natural porous fillers, optionally mineral foam, pumice, foamed lava and/or expanded vermiculite.

4. Hydraulically setting dry mix according to claim 1, wherein the redispersible polymer powder is present as vinyl acetate polymer, vinyl acetate-ethylene copolymer, vinyl acetate-vinyl ester copolymer and/or vinyl acetate-vinyl ester-ethylene copolymer, with the vinyl ester monomers being selected in each case from the group consisting of vinyl laurate, vinyl pivalate and vinyl versatates, and/or is present as vinyl acetate-acrylic ester copolymer, vinyl acetate-acrylic ester-ethylene copolymer, styrene-butadiene copolymer and styrene-acrylic ester copolymer, with the acrylic esters in each case being esters with branched or unbranched alcohols having from 1 to 10 carbon atoms.

5. Hydraulically setting dry mix according to claim 1, wherein the water retention agent based on polysaccharide structures is present as methylhydroxyethylcellulose and/or methylhydroxypropylcellulose.

6. Hydraulically setting dry mix according to claim 1, wherein the structural units containing a sulphonic acid group and having the general formula (I) in the anionic copolymer are derived from 2-acrylamido-2-methylpropanesulphonic acid and/or its salts.

7. Hydraulically setting dry mix according to claim 1, wherein the cationic structural units containing a quaternary nitrogen atom and having the general formula (III) in the cationic copolymer are derived from [3-(methacryloylamino)propyl]trimethylammonium salts and/or [3-(acryloylamino)-propyl]trimethylammonium salts.

8. Hydraulically setting dry mix according to claim 1, wherein the structural units containing a (meth)acrylamido group and having the general formula (II) are derived from acrylamide, methacrylamide, methylacrylamide and/or N,N-dimethylacrylamide.

9. Hydraulically setting dry mix according to claim 1, wherein the structural units derived from monomer compounds having more than one ethylenically unsaturated vinyl group are derived from triallylisocyanurate, triallylamine, N,N'-methylenebisacrylamide and/or N,N'-methylenebismethacrylamide.

10. Hydraulically setting dry mix according to claim 1, wherein the anionic pulverulent copolymer contains from 20 to 50 mol percent of structural units derived from 2-acrylamido-2-methylpropanesulphonic acid and from 50 to 80 mol percent of structural units derived from acrylamide, and a crosslinker monomer which is triallylamine and/or N,N'-methylenebisacrylamide.

11. Hydraulically setting dry mix according to claim 1, wherein the cationic pulverulent copolymer contains from 20 to 50 mol percent of structural units derived from [3-(acryloylamino)propyl]-trimethylammonium chloride and from 50 to 80 mol percent of structural units derived from acrylamide, and a crosslinker monomer which is triallylamine and/or N,N'-methylenebisacrylamide.

12. Hydraulically setting dry mix according to claim 1, further comprising
g) from 0.1 to 1.5 percent by weight of a water-soluble copolymer which contains sulpho groups and comprises
g-i) from 3 to 96 mol percent of structural units of the general formula (I)

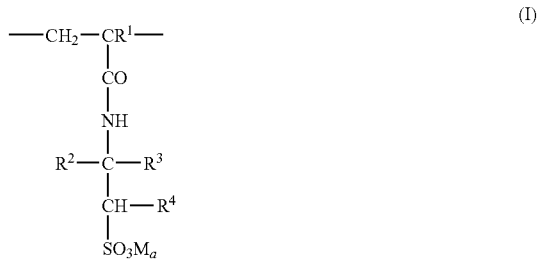

where
the radicals $R^1$ are identical or different and are each hydrogen or a methyl radical,
the radicals $R^2$, $R^3$, $R^4$ are in each case identical or different and are each, independently of one another, hydrogen, an aliphatic, branched or unbranched hydrocarbon radical having from 1 to 6 carbon atoms or an aromatic hydrocarbon radical having from 6 to 14 carbon atoms,
the ions M are identical or different and are each hydrogen, a monovalent or divalent metal cation or an ammonium ion,
the indices a are identical or different and are each either ½ or 1,
g-ii) from 3 to 96 mol percent of structural units of the general formula (II)

where
the radicals $R^1$ are identical or different and are each hydrogen or a methyl radical,
the radicals $R^5$ and $R^6$ are in each case identical or different and are each, independently of one another, hydrogen, a branched or unbranched aliphatic hydrocarbon radical having from 1 to 20 carbon atoms, a cycloaliphatic hydrocarbon radical having from 5 to 8 carbon atoms or an aryl radical having from 6 to 14 carbon atoms, and at least one further structural unit selected from among g-iii) from 0.001 to 10 mol percent of structural units of the general formula (IV)

$$—CH_2—CR^1— \atop | \atop G \qquad (IV)$$

where the radicals $R^1$ are identical or different and are each hydrogen or a methyl radical, the radicals G are identical or different and are each $—COO(C_nH_{2n}O)_p—R^{11}$ or $—(CH_2)_q—O(C_nH_{2n}O)_p—R^{11}$, the radicals $R^{11}$ are identical or different and are each

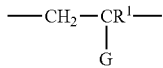

or an unsaturated or saturated, linear or branched aliphatic alkyl radical having from 10 to 40 carbon atoms, the radicals $R^{12}$ are identical or different and are each hydrogen, a $C_1$-$C_6$-alkyl group, an arylalkyl group having a $C_1$-$C_{12}$-alkyl radical and a $C_6$-$C_{14}$-aryl radical, the indices n are identical or different and are each an integer from 2 to 4, the indices p are identical or different and are each an integer from 0 to 200, the indices q are identical or different and are each an integer from 0 to 20, the indices r are identical or different and are each an integer from 0 to 3, and g-iv) from 0.1 to 30 mol percent of structural units of the general formula (V)

$$—CH_2—CR^1— \atop | \atop Z \qquad (V)$$

where the radicals $R^1$ are identical or different and are each hydrogen or a methyl radical, Z is $—(CH_2)_q—O(C_nH_{2n}O)_p—R^{13}$, the indices n are identical or different and are each an integer from 2 to 4, the indices p are identical or different and are each an integer from 0 to 200, and the indices q are identical or different and are each an integer from 0 to 20, and the radicals $R^{13}$ are identical or different and are each hydrogen or a $C_1$-$C_4$-alkyl radical.

13. Hydraulically setting dry mix according to claim 1, further comprising h) from 0.1 to 1.5 percent by weight of a water-soluble cationic copolymer comprising h-i) from 5 to 60 mol percent of structural units of the general formula (VI),

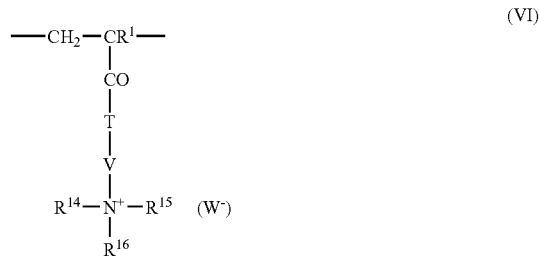

where the radicals $R^1$ are identical or different and are each hydrogen or a methyl radical, $R^{14}$ and $R^{15}$ are in each case identical or different and are each, independently of one another, hydrogen, an aliphatic hydrocarbon radical having from 1 to 20 carbon atoms, a cycloaliphatic hydrocarbon radical having from 5 to 8 carbon atoms and/or an aryl radical having from 6 to 14 carbon atoms, the radicals $R^{16}$ are identical or different and are each a substituent identical to $R^{14}$ or $R^{15}$, $—(CH_2)_x—SO_3L_a$,

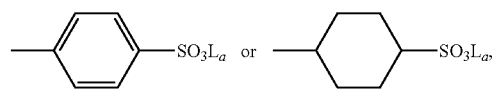

the ions L are identical or different and are each a monovalent or divalent metal cation, ammonium cation or quaternary ammonium cation $(NR_1R_{14}R_{15}R_{16})^+$, the indices a are identical or different and are each ½ or 1, the radicals T are identical or different and are each oxygen, —NH and/or —$NR^{14}$, the radicals V are identical or different and are each $—(CH_2)_m—$,

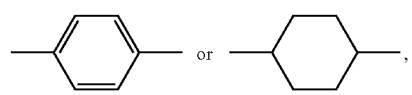

the indices m are identical or different and are each an integer from 1 to 6, the ions $W^-$ are identical or different and are each a halogen atom, $C_1$-$C_4$-alkylsulphate or $C_1$-$C_4$-alkylsulphonate, h-ii) from 20 to 80 mol percent of a structural unit having the general formulae (VIIa) and/or (VIIb):

$$—CH_2—CR^1— \atop {\underset{NR^{14}R^{15}}{|} \atop CO}$$ (VIIa)

$$—CH_2—CR^1— \atop {\underset{Q}{\underset{|}{N}}—CO—R^{15}}$$ (VIIb)

where the radicals Q are identical or different and are each hydrogen or —$CHR^{14}R^{17}$, the radicals $R^1$ are identical or different and are each hydrogen or a methyl radical, the radicals $R^{14}$, $R^{15}$ are in each case identical or different and are each, independently of one another, hydrogen, an aliphatic hydrocarbon radical having from 1 to 20 carbon atoms, a cycloaliphatic hydrocarbon radical having from 5 to 8 carbon atoms and/or an aryl radical having from 6 to 14 carbon atoms, with the proviso that when Q is not hydrogen then $R^{14}$ and $R^{15}$ in the general formula (VIIb) can together form a —$CH_2$—$(CH_2)_y$— methylene group so that the general formula (VIIb) represents the following structure:

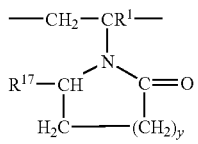

where the radicals $R^{17}$ are identical or different and are each a hydrogen atom, a $C_1$-$C_4$-alkyl radical, a carboxylic acid group or a carboxylate group —$COOL_a$, where the indices y are identical or different and are each an integer from 1 to 4, and the ions L are identical or different and are each a monovalent or divalent metal cation, ammonium cation or quaternary ammonium cation $(NR_1R_{14}R_{15}R_{16})^+$, and the indices a are identical or different and are each ½ or 1, h-iii) from 0.01 to 3 mol percent of structural units of the general formula (VIII)

$$—CH_2—CR^1— \atop {\underset{U}{|}}$$ (VIII)

where the radicals U are identical or different and are each —$COO(C_nH_{2n}O)_s$—$R^{18}$ or —$(CH_2)_q$—$O(C_nH_{2n}O)_s$—$R^{18}$, the indices n are identical or different and are each an integer from 2 to 4, the indices s are identical or different and are each an integer from 1 to 200, the indices q are identical or different and are each an integer from 0 to 20, the radicals $R^{18}$ are identical or different and are each

the radicals $R^{19}$ are identical or different and are each hydrogen, a $C_1$-$C_6$-alkyl group or an arylalkyl group having a $C_1$-$C_{12}$-alkyl radical and a $C_6$-$C_{14}$-aryl radical, the indices z are identical or different and are each an integer from 1 to 3 and the radicals $R^1$ are identical or different and are each hydrogen or a methyl radical.

14. Building material mix comprising a hydraulically setting dry mix according to claim 1, and water.

15. The building material mix according to claim 14, comprising tile adhesive in accordance with DIN EN 12004, sealing slurry, or joint filler in accordance with EN 13888, repair mortar in accordance with EN 1504, knifing filler, parquet adhesive, screed, plaster or render in accordance with EN 998-1 or adhesive mortar or reinforcing mortar for composite thermal insulation systems (CTIS) in accordance with EN 13499 and EN 13500.

16. Hydraulically setting dry mix according to claim 1, wherein the anionic pulverulent copolymer is swellable by means of water or salt solutions and the proportion of extractable material is less than 10% by weight.

17. Hydraulically setting dry mix according to claim 1, wherein the cationic pulverulent copolymer is swellable by means of water or salt solutions and the proportion of extractable material is less than 10% by weight.

* * * * *